US007838166B2

(12) United States Patent
Matsuzaki et al.

(10) Patent No.: US 7,838,166 B2
(45) Date of Patent: Nov. 23, 2010

(54) METHOD FOR FABRICATING SOLID OXIDE FUEL CELL MODULE

(75) Inventors: Yoshio Matsuzaki, Tokyo (JP); Kenjiro Fujita, Tokyo (JP); Teruhiro Sakurai, Tokyo (JP); Kei Ogasawara, Tokyo (JP)

(73) Assignee: Tokyo Gas Co., Ltd., Tokyo (JP)

( * ) Notice: Subject to any disclaimer, the term of this patent is extended or adjusted under 35 U.S.C. 154(b) by 1265 days.

(21) Appl. No.: 10/549,842

(22) PCT Filed: Mar. 31, 2004

(86) PCT No.: PCT/JP2004/004595

§ 371 (c)(1),
(2), (4) Date: Sep. 16, 2005

(87) PCT Pub. No.: WO2004/088783

PCT Pub. Date: Oct. 14, 2004

(65) Prior Publication Data

US 2006/0153974 A1 Jul. 13, 2006

(30) Foreign Application Priority Data

Mar. 31, 2003 (JP) ............................. 2003-094513

(51) Int. Cl.
*H01M 8/24* (2006.01)
*H01M 4/88* (2006.01)
*H01M 8/10* (2006.01)
*B03C 3/00* (2006.01)
(52) U.S. Cl. ...................... 429/485; 429/479; 429/484; 429/491; 429/496; 429/482; 502/101
(58) Field of Classification Search ................ 427/115; 429/30–33, 38, 40–41, 44–45; 502/101; H01M 8/10, H01M 8/12, 4/88
See application file for complete search history.

(56) References Cited

U.S. PATENT DOCUMENTS 5,143,801 A * 9/1992 Bates .......................... 429/33

(Continued)

FOREIGN PATENT DOCUMENTS

EP 0 516 417 A1 12/1992

(Continued)

OTHER PUBLICATIONS

Machine translation of Akiyama (JP07-326375).*

(Continued)

*Primary Examiner*—Melvin C Mayes
*Assistant Examiner*—Jun Li
(74) *Attorney, Agent, or Firm*—Flynn, Thiel, Boutell & Tanis, P.C.

(57) ABSTRACT

A method of manufacturing a solid oxide fuel cell module involves the steps of co-sintering the respective fuel electrodes, and the respective electrolytes, subsequently forming a dense interconnector out of a dense interconnector material, or an interconnector material which turns dense by sintering in at least parts of the solid oxide fuel cell module, in contact with the respective fuel electrodes, and the respective electrolyte, and forming an air electrode on the respective electrolytes before electrically connecting the respective electrodes with the respective first parts of the interconnectors electrically connecting the respective electrodes with the respective first parts of the respective interconnectors via respective second parts of the interconnectors which have a density less than the respective first parts.

35 Claims, 23 Drawing Sheets

U.S. PATENT DOCUMENTS

| | | | |
|---|---|---|---|
| 5,372,895 A * | 12/1994 | Sato et al. | 429/30 |
| 5,807,642 A * | 9/1998 | Xue et al. | 429/33 |
| 6,534,211 B1 * | 3/2003 | Tsukuda et al. | 429/40 |
| 2004/0053087 A1 * | 3/2004 | Akikusa et al. | 429/20 |
| 2005/0155490 A1 * | 7/2005 | Barker et al. | 96/15 |

FOREIGN PATENT DOCUMENTS

| | | |
|---|---|---|
| JP | 4-230954 | 8/1992 |
| JP | 5-166519 | 7/1993 |
| JP | 6-44983 | 2/1994 |
| JP | 6-310155 | 11/1994 |
| JP | 10-79259 | 3/1998 |
| JP | 11-73975 | 3/1999 |
| JP | 2000-106192 | 4/2000 |
| JP | 2003-317738 | 11/2003 |
| WO | WO 02/089242 A1 | 11/2002 |

OTHER PUBLICATIONS

Fifth European Solid Oxide Fuel Cell Forum, Proceedings, vol. 2, Jul. 2002, pp. 1075-1083.

"Functionally graded composite cathodes for solid oxide fuel cells", by N.T. Hart et al, Journal of Power Sources, Elsevier, Amsterdam, NL, vol. 106, No. 1-2, Apr. 2002, pp. 42-50.

* cited by examiner

METHOD FOR FABRICATING SOLID OXIDE FUEL CELL MODULE

TECHNICAL FIELD

The invention relates to a method of manufacturing a solid oxide fuel cell module, and more specifically, to a method of manufacturing a solid oxide fuel cell module of a multi-segment type.

BACKGROUND TECHNOLOGY

A solid oxide fuel cell (referred to hereinafter merely as an SOFC where appropriate) is a fuel cell using an oxide as a solid electrolytic material having ionic conductivity. The fuel cell generally has an operating temperature as high as on the order of 1000° C., but there has lately been developed one having an operating temperature not higher than 800° C., for example, on the order of 750° C. With the SOFC, there are disposed a fuel electrode (that is, an anode), and an air electrode (that is, a cathode) with an electrolytic material sandwiched therebetween, thereby making up a single cell as a three-layer unit of the fuel electrode/an electrolyte/the air electrode. Although the air electrode is an oxygen electrode in the case of using oxygen as an oxidizing agent, it includes the oxygen electrode according to the invention.

When the SOFC is operated, fuel is fed to the fuel electrode side of the single cell (also referred to merely as "a cell" where appropriate in the present description), air and oxygen enriched air as an oxidizing agent or oxygen is fed to the air electrode side thereof, and electric power is obtained by connecting both the electrodes to an external load. However, with the single cell of one unit only, a voltage only on the order of 0.7V at most can be obtained, so that there is the need for connecting in series a plurality of the single cells together in order to obtain electric power for practical use. For the purpose of electrically connecting adjacent cells with each other while simultaneously feeding fuel, and air to the fuel electrode, and the air electrode, respectively, after properly distributing them, and subsequently, effecting emission thereof, separators (=interconnectors) and the single cells are alternately deposited.

Such a SOFC module is a type wherein a plurality of the single cells are stacked one on top of another, but it is conceivable to adopt a multi-segment type in place of such a type as described. For example, in Fifth European Solid Oxide Fuel Cell forum (1 to 5, July, 2002) p. 1075-, the external appearance, and so forth, of the multi-segment type are disclosed although the contents thereof are not necessarily clear-cut in detail. As the multi-segment type, two types including a cylindrical type, and a hollow flat type are conceivable.

FIGS. 1(a) to 1(c) are views showing an example of the structure of the hollow flat type of the two types, FIG. 1(a) being an oblique perspective view, FIG. 1(b) a plan view, and FIG. 1(c) a sectional view taken on line A-A in FIG. 1(b). As shown in FIGS. 1(a) to 1(c), there are formed a plurality of cells 2 each made up by stacking a fuel electrode 3, an electrolyte 4, and an air electrode 5 in that order on an insulator substrate 1 in a hollow flat sectional shape, and the respective cells 2 are structured so as to be electrically connected in series with each other through the intermediary of an interconnector 6, respectively. Fuel is caused to flow in space (=a hollow area) within the insulator substrate 1, that is, an internal fuel flow part 7, in parallel with a lineup of the cells 2, as indicated by an arrow (→) in FIGS. 1(a), and 1(c). In FIG. 1(c), the interconnector 6 is seen covering part of the surface of the air electrode 5, however, may cover the entire surface thereof. In this respect, the same can be said hereinafter.

For a constituent material of the insulator substrate in the hollow flat sectional shape, use can be made of a porous material capable of withstanding the operating temperature of an SOFC module, but use is normally made of a ceramic. For use in the electrolyte, a solid electrolytic material having ionic conductivity is sufficient, and use can be made of a sheet like a sintered body such as, for example, yttria-stabilized zirconia (YSZ). For the fuel electrode, use is made of a porous material such as, for example, a mixture of Ni and yttria-stabilized zirconia YSZ (Ni/YSZ cermet), and so forth. For the air electrode, use is made of a porous material, for example, Sr-doped $LaMnO_3$, and so forth.

In fabrication of the respective cells, the fuel electrode, the electrolyte, and the air electrode are normally fabricated by separate processes by screen printing, and so forth, and those electrodes are deposited in that order on top of the insulator substrate in the hollow flat sectional shape to be subsequently sintered, thereby forming the respective cells. The respective adjacent cells are structured so as to be electrically connected in series with each other through the intermediary of the interconnector.

DISCLOSURE OF THE INVENTION

However, at the time of manufacturing the SOFC module of the multi-segment type, that is, the SOFC module in which the respective cells are lined up as described in the foregoing, in the case of using, for example, the Ni/YSZ cermet as the constituent material of the fuel electrode, if the insulator substrate, and the respective fuel electrodes, being in contact with each other, are sintered, the constituent material of the fuel electrodes undergoes contraction. Meanwhile, because the insulator substrate does not undergo thermal contraction, the fuel electrodes crack. For this reason, in the fabrication of the cells, the production yield is poor and productivity is low. In addition there has also arisen a problem that the mechanical strength of the fuel electrodes is very weak.

With the SOFC module of the multi-segment type, there is the need for electrically connecting the fuel electrode to the air electrode between the adjacent cells through the intermediary of an interconnector. With the interconnectors, it is required that the electrical resistivity is low, and contact resistance can be controlled, and furthermore, a high sealing performance and high heat resistance are required at both sides of the fuel electrode and the air electrode. In addition, chemical stability is required in both an oxidizing and reducing atmosphere. For those reasons, as the constituent material of the interconnector, $(La, Sr)CrO_3$ has been used in the past.

However, although this material, that is, $(La, Sr)CrO_3$ has a high chemical stability in both the oxidizing and reducing atmosphere, it has been very difficult to obtain a dense sintered body out of the material, thereby obtaining high gas-sealing performance. That is, since the material has poor sinterability, it has been difficult to implement fabrication of the interconnector out of the same with ease, and consequently, it has been impossible to secure gas-sealing performance. Furthermore, because the material is high in electrical resistivity, use thereof has been under constraints such as the need for use after reduction in thickness thereof, or the need for use at a high temperature around 1000° C.

It is therefore an object of the invention to provide a method of manufacturing a solid oxide fuel cell module of a multi-segment type, developed by solving various problems encountered in the process of manufacturing the solid oxide fuel cell module of the multi-segment type. More particularly, the object of the invention is to solve the problems of sinterability occurring between respective fuel electrodes, and respective electrolytes, among the respective fuel electrodes, the respective electrolytes, and respective interconnectors, among a substrate, the respective fuel electrodes, and the respective electrolytes, or among the substrate, the respective fuel electrodes, the respective electrolytes, and the respective interconnectors, and so forth, and further, to provide the method of manufacturing a solid oxide fuel cell module of the multi-segment type, capable of attaining a high gas-sealing performance, enhancing productivity, and achieving a reduction in cost.

The method of manufacturing the solid oxide fuel cell module, according to the invention, and variations thereof are sequentially described hereinafter.

It is a first aspect of the invention to provide a method of manufacturing a solid oxide fuel cell module comprising a plurality of cells each made up of a fuel electrode, an electrolyte, and an air electrode sequentially formed on a surface of a substrate with an internal fuel flow part provided therein, at least a face of the substrate, in contact with the cells, and interconnectors, being an insulator, and the cells adjacent to each other, being electrically connected in series through the intermediary of the respective interconnectors, said method of manufacturing the solid oxide fuel cell module comprising the steps of co-sintering the respective fuel electrodes, and the respective electrolytes, subsequently forming a dense interconnector out of a dense interconnector material, or an interconnector material which turns dense by sintering in at least parts of the solid oxide fuel cell module, in contact with the respective fuel electrodes, and the respective electrolyte, and forming an air electrode on the respective electrolytes before electrically connecting the air electrode with the respective dense interconnectors.

It is a second aspect of the invention to provide the method of manufacturing a solid oxide fuel cell module comprising a plurality of cells each made up of a fuel electrode, an electrolyte, and an air electrode sequentially formed on a surface of a substrate with an internal fuel flow part provided therein, at least a face of the substrate, in contact with the cells, and interconnectors, being an insulator, and the cells adjacent to each other, being electrically connected in series through the intermediary of the respective interconnectors, said method of manufacturing the solid oxide fuel cell module comprising the steps of co-sintering the substrate, the respective fuel electrodes, and the respective electrolytes, subsequently forming a dense interconnector out of a dense interconnector material, or an interconnector material which turns dense by sintering in at least parts of the solid oxide fuel cell module, in contact with the respective fuel electrodes, and the respective electrolytes, and forming an air electrode on the respective electrolytes before electrically connecting the air electrode with the respective dense interconnectors.

It is a third aspect of the invention to provide a method of manufacturing a solid oxide fuel cell module comprising a plurality of cells each made up of a fuel electrode, an electrolyte, and an air electrode sequentially formed on a surface of a substrate with an internal fuel flow part provided therein, at least a face of the substrate, in contact with the cells, and interconnectors, being an insulator, and the cells adjacent to each other, being electrically connected in series through the intermediary of the respective interconnectors, said method of manufacturing the solid oxide fuel cell module comprising the steps of co-sintering the respective fuel electrodes, the respective electrolytes, and a dense interconnector material, or an interconnector material which turns dense by co-sintering, in at least parts of the solid oxide fuel cell module, in contact with the respective fuel electrodes, and the respective electrolytes, and forming an air electrode on the respective electrolytes before electrically connecting the air electrode with the respective dense interconnectors.

It is a fourth aspect of the invention to provide a method of manufacturing a solid oxide fuel cell module comprising a plurality of cells each made up of a fuel electrode, an electrolyte, and an air electrode sequentially formed on a surface of a substrate with an internal fuel flow part provided therein, at least a face of the substrate, in contact with the cells, and interconnectors, being an insulator, and the cells adjacent to each other, being electrically connected in series through the intermediary of the respective interconnectors, said method of manufacturing the solid oxide fuel cell module comprising the steps of co-sintering the substrate, the respective fuel electrodes, the respective electrolytes, and a dense interconnector material, or an interconnector material which turns dense by co-sintering, in at least parts of the solid oxide fuel cell module, in contact with the respective fuel electrodes, and the respective electrolytes, and forming an air electrode on the respective electrolytes before electrically connecting the air electrode with the respective dense interconnectors.

It is a fifth aspect of the invention to provide a method of manufacturing a solid oxide fuel cell module comprising a plurality of cells each made up of a fuel electrode, an electrolyte, and an air electrode sequentially formed on a surface of a substrate with an internal fuel flow part provided therein, at least a face of the substrate, in contact with the cells, and interconnectors, being an insulator, and the cells adjacent to each other being electrically connected in series through the intermediary of the respective interconnectors, said method of manufacturing the solid oxide fuel cell module comprising the steps of disposing a dense interconnector material, or an interconnector material which turns dense by co-sintering, in portions of the respective fuel electrodes, subsequently covering the respective fuel electrodes, and the dense interconnector material, or the interconnector material turning dense by co-sintering before co-sintering the respective fuel electrodes, the dense interconnector material, or the interconnector material which turns dense by co-sintering, and the respective electrolytes, thereby forming dense interconnectors, forming an air electrode on the respective electrolytes, and subsequently electrically connecting the air electrode with the respective dense interconnectors.

It is a sixth aspect of the invention to provide a method of manufacturing a solid oxide fuel cell module comprising a plurality of cells each made up of a fuel electrode, an electrolyte, and an air electrode sequentially formed on a surface of a substrate with an internal fuel flow part provided therein, at least a face of the substrate in contact with the cells, and interconnectors, being an insulator, and the cells adjacent to each other being electrically connected in series through the intermediary of the respective interconnectors, said method of manufacturing the solid oxide fuel cell module comprising the steps of disposing a dense interconnector material, or an interconnector material which turns dense by co-sintering, in portions of the respective fuel electrodes, subsequently covering the respective fuel electrodes, and the dense interconnector material, or the interconnector material which turns dense by co-sintering before co-sintering the substrate, the respective fuel electrodes, the dense interconnector material, or the interconnector material which turns dense by co-sintering, and the respective electrolytes, thereby forming dense interconnectors, forming an air electrode on the respective electrolytes, and subsequently electrically connecting the air electrode with the respective dense interconnectors.

BEST MODE FOR CARRYING OUT THE INVENTION

Figure 1:
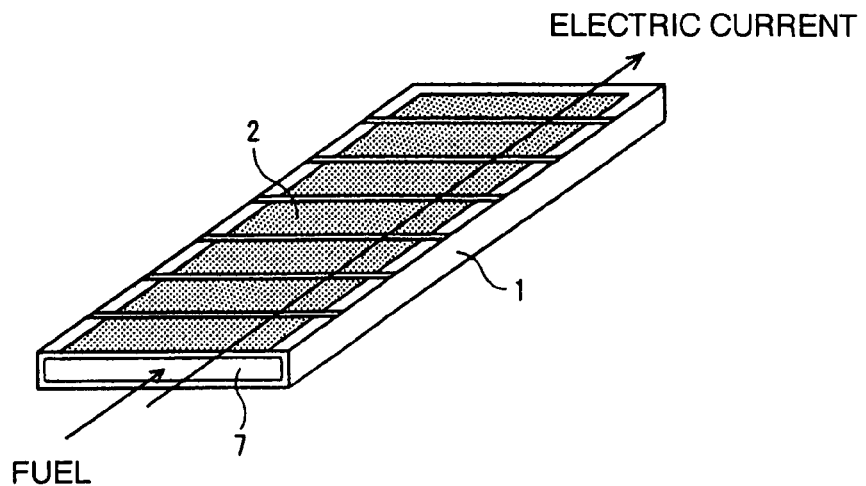
FIGS. 1(a) to 1(c) are views showing an example of the structure of a hollow flat type solid oxide fuel cell module.
Figure 1:
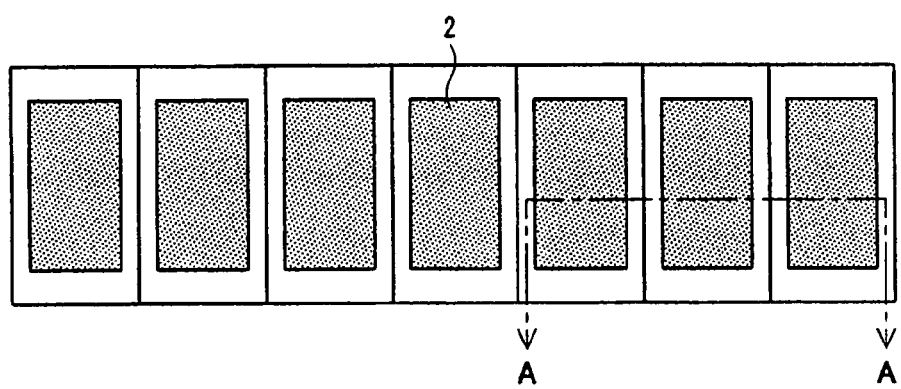
Figure 1:
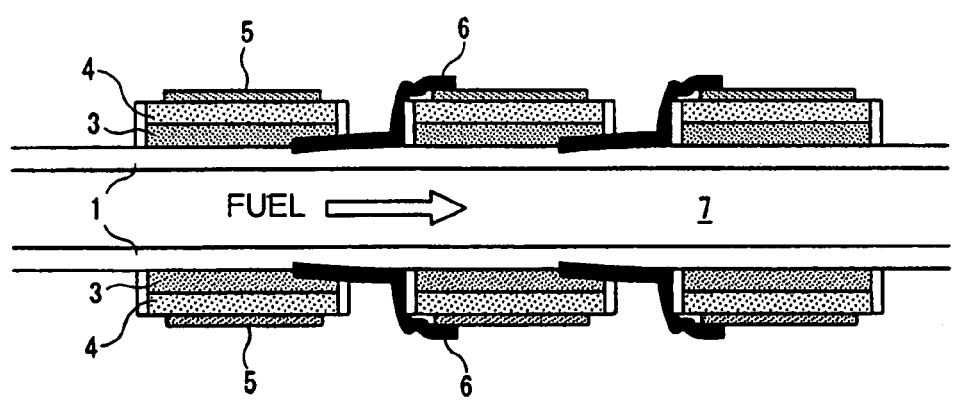

The present invention is concerned with a method of manufacturing an SOFC module comprising a plurality of cells each made up of a fuel electrode, an electrolyte, and an air electrode sequentially formed on a surface of a substrate with an internal fuel flow part provided therein, at least a face of the substrate in contact with the cells, and interconnectors, being an insulator, (that is, the cells are each provided with the fuel electrode, electrolyte, and air electrode, sequentially formed on the surface of the substrate thereof), and the cells adjacent to each other, being electrically connected in series through the intermediary of the respective interconnectors. Herein, the interconnector refers to a member linking the fuel electrode of one of the adjacent cells, that is, the preceding cell, with the air electrode of the other cell, that is, the cell immediately succeeding thereto.

The invention has a fundamental feature in that prior to formation of the air electrode on the respective electrolytes, (a) the respective fuel electrodes, and the respective electrolytes are co-sintered, (b) the substrate, the respective fuel electrodes, and the respective electrolytes are co-sintered, or (c) those members, and at least portions of an interconnector material, in contact with the respective fuel electrodes, and the respective electrolytes, are co-sintered. The case of co-sintering under (c) as above include a case of the respective fuel electrodes, and the respective electrolytes being sintered simultaneously with the portions of the interconnector material, in contact with at least the respective fuel electrodes, and the respective electrolytes, and a case of the substrate, the respective fuel electrodes, and the respective electrolytes being sintered simultaneously with the portions of the interconnector material, in contact with at least the respective fuel electrodes, and the respective electrolytes.

That is, in terms of combination of members co-sintered in co-sintering under (a) to (c) as above, sintering is made between the respective fuel electrodes, and the respective electrolytes (i), among the substrate, the respective fuel electrodes, and the respective electrolytes (ii), among the respective fuel electrodes, the respective electrolytes, and the portions of the interconnector material, in contact with at least the respective fuel electrodes, and the respective electrolytes (iii), and among the substrate, the respective fuel electrodes, the respective electrolytes, and the portions of the interconnector material, in contact with at least the respective fuel electrodes, and the respective electrolytes (iv). A co-sintered body is formed between the respective members described. A sintering temperature is in a range of 800 to 1600° C., preferably a range of 1200 to 1500° C., and is suitably selected before application, depending on the kinds of constituent materials of the respective members, combination of the respective members, and so forth.

Fundamental Features of the Invention (1) to (6)

The invention (1) has a feature in that prior to the formation of an air electrode on respective electrolytes, respective fuel electrodes, and the respective electrolytes are co-sintered, and a dense interconnector is formed out of a dense interconnector material, or an interconnector material which turns dense by sintering, in at least parts of the solid oxide fuel cell module, in contact with the respective fuel electrodes, and the respective electrolytes. The dense interconnector formed at this point in time is not electrically connected to the respective air electrodes as yet and, accordingly, corresponds to a precursory member in the process of forming the interconnector as a constituent element of the cell. With the invention (1), a co-sintered body of the fuel electrodes, and the electrolytes is separately joined to a substrate through the intermediary of a joining material, and so forth.

The invention (2) has a feature in that prior to formation of an air electrode on respective electrolytes, a substrate, respective fuel electrodes, and the respective electrolytes are co-sintered, and at least portions of a dense interconnector, coming into contact with both the respective fuel electrodes, and the respective electrolytes, are formed of a dense interconnector material, or an interconnector material turning dense by sintering. The dense interconnector formed at this point in time is not electrically connected to the respective air electrodes as yet, and accordingly, corresponds to a precursory member in the process of forming the interconnector as a constituent element of the cell.

The invention (3) has a feature in that prior to formation of an air electrode on respective electrolytes, respective fuel electrodes, the respective electrolytes, and at least portions of a dense interconnector material, or portions of an interconnector material which turns dense by co-sintering, coming into contact with both the respective fuel electrodes, and the respective electrolytes, are co-sintered. At this point in time, the dense interconnector material is turned into a dense interconnector by co-sintering, and the interconnector material which turns dense by co-sintering is turned into a dense interconnector by the co-sintering, however the dense interconnector formed at this point in time is not electrically connected to the respective air electrodes in a stage of the co-sintering and, accordingly, corresponds to a precursory member in the process of forming the interconnector as a constituent element of the cell. With the invention (3), respective co-sintered bodies are separately joined to a substrate through the intermediary of a joining material, and so forth.

The invention (4) has a feature in that prior to formation of an air electrode on the respective electrolytes, a substrate, respective fuel electrodes, the respective electrolytes, and at least portions of a dense interconnector material, or portions of an interconnector material which turns dense by co-sintering, coming into contact with both the respective fuel electrodes, and the respective electrolytes, are co-sintered. At this point in time, the dense interconnector material is turned into a dense interconnector by the co-sintering, and the interconnector material which turns dense by the co-sintering is turned into a dense interconnector by the co-sintering, however, the dense interconnector formed at this point in time is not electrically connected to the respective air electrodes in a stage of the co-sintering and, accordingly, corresponds to a precursory member in the process of forming the interconnector as a constituent element of the cell.

The invention (5) has a feature in that prior to the formation of an air electrode on respective electrolytes, a dense interconnector material, or an interconnector material which turns dense by co-sintering is disposed on portions of respective fuel electrodes and the respective fuel electrodes and the interconnector material are subsequently covered with the respective electrolytes before the respective fuel electrodes, the interconnector material, and the respective electrolytes are co-sintered. At this point in time, the dense interconnector material turns into a dense interconnector by the co-sintering, and the interconnector material which turns dense by the co-sintering turns into a dense interconnector by the co-sintering, however, the dense interconnector formed at this point in time is not electrically connected to the respective air electrodes in a stage of the co-sintering and, accordingly, corresponds to a precursory member in the process of forming the interconnector as a constituent element of the cell.

With the invention (5), the respective co-sintered bodies are separately joined to a substrate through the intermediary of a joining material, and so forth.

The invention (6) has a feature in that prior to the formation of an air electrode on the respective electrolytes, a dense interconnector material, or an interconnector material which turns dense by co-sintering is disposed on portions of the respective fuel electrodes, and a substrate, the respective fuel electrodes, and the interconnector material are subsequently covered with the respective electrolytes before the substrate, the respective fuel electrodes, the interconnector material, and the respective electrolytes are co-sintered. At this point in time, the dense interconnector material turns into a dense interconnector by the co-sintering, and the interconnector material which turns dense by the co-sintering turns into a dense interconnector by the co-sintering, however, the dense interconnector formed at this point in time is not electrically connected to the respective air electrodes in a stage of the co-sintering and, accordingly, corresponds to a precursory member in the process of forming the interconnector as a constituent element of the cell.

With the invention, as a constituent material of "a substrate with an internal fuel flow part provided therein, at least a face thereof, in contact with cells, and interconnectors, being an insulator", use can be made of a mixture of MgO, and $MgAl_2O_4$, a zirconia-based oxide, a mixture of the zirconia-based oxide, MgO, and $MgAl_2O_4$, and so forth. Among those materials, the mixture of MgO, and $MgAl_2O_4$ is preferably a mixture of MgO, and $MgAl_2O_4$ containing 20 to 70 vol. % of MgO. Further, as an example of the zirconia-based oxide, there can be cited a yttria-stabilized zirconia [YSZ: $(Y_2O_3)_x(ZrO_2)_{1-x}$ (in chemical formula, x=0.03 to 0.12)], and so forth.

As a constituent material of the fuel electrode, use is made of a material composed mainly of Ni, and a ceramic material containing a metal. As the ceramic material of the ceramic material containing the metal, use is made of, for example, a yttria-stabilized zirconia [YSZ: $(Y_2O_3)_x(ZrO_2)_{x-1}$ (in chemical formula, x=0.05 to 0.15)], and as the metal, use is made of at least one kind of metal, namely, one kind or not less than two kinds of metals selected from the group consisting of Ni, Cu, Fe, Ru, and Pd. Among those ceramic material containing the metals, YSZ containing Ni, that is, a mixture of Ni and YSZ [$(Y_2O_3)_x(ZrO_2)_{1-x}$ (in chemical formula, x=0.05 to 0.15)] is a preferable material for the fuel electrode according to the invention and, particularly, a material with not less than 40 vol. % of Ni diffused in the mixture is preferably used.

As a constituent material of the electrolyte, use may be of a solid electrolytic material having an ionic conductivity and, as examples of the constituent material, there can be included materials described under items (1) to (4) given hereunder:

(1) a yttria-stabilized zirconia [YSZ: $(Y_2O_3)_x(ZrO_2)_{1-x}$ (in chemical formula, x=0.05 to 0.15)].

(2) a scandia-stabilized zirconia [$(Sc_2O_3)_x(ZrO_2)_{1-x}$ (in chemical formula, x=0.05 to 0.15)].

(3) a yttria-doped ceria [$(Y_2O_3)_x(CeO_2)_{1-x}$ (in chemical formula, x=0.02 to 0.4)].

(4) a gadolinia-doped ceria [$(Gd_2O_3)_x(CeO_2)_{1-x}$ (in chemical formula, x=0.02 to 0.4)].

EFFECT OF THE INVENTION

With an SOFC module of a multi-segment type, according to the invention, it is possible to solve the problems of sinterability occurring between the respective fuel electrodes, and the respective electrolytes, among the respective fuel electrodes, the respective electrolytes, and the respective interconnectors, among the substrate, the respective fuel electrodes, and the respective electrolytes, or among the substrate, the respective fuel electrodes, the respective electrolytes, and the respective interconnectors, and so forth and, further, to attain a high gas-sealing performance by virtue of the respective dense interconnectors, and the respective electrolytes, and secure electrical contact at portions of the respective interconnectors, in contact with the respective fuel electrodes. Consequently, it is possible to obtain various useful effects such as an enhancement in productivity of the solid oxide fuel cell module of the multi-segment type, and capability of achieving a reduction in cost.

Constituent Material of the Interconnector

In the SOFC module, the interconnector linking the fuel electrode to the air electrode between the respective cells adjacent to each other is required to achieve an electrical continuity between the fuel electrode and the air electrode, and to be low in electrical resistance, having a high gas-sealing performance, and heat resistance at both the fuel electrode and the air electrode. With the invention, as a constituent material of the interconnector, use is made of a material meeting those requirements and, as examples of the constituent material of the interconnector, there can be cited materials described under items (1) to (4) given hereunder:

(1) a mixture of a glass and an electroconductive material. Since a glass is normally an insulator, in order to cause current to flow therethrough, the surface thereof is provided with a metal such as Ag, Pt, and so forth, or a film of $In_2O_3$, or $SnO_2$, and so forth, for utilization of the electroconductivity thereof. With the invention, as the constituent material of the interconnector, use is made of the mixture of the glass and the electroconductive material, that is, the mixture made by mixing the electroconductive material into the glass. There is no particular limitation to the kind of glass used in this case and use can be made of a glass of a network structure, including $SiO_2$ or $Al_2O_3$ in addition to $SiO_2$, containing $K_2O$, ZnO, BaO, $Na_2O$, CaO, and so forth and, for example, among soda glass, borosilicate glass, silica glass, and so forth, a suitable one may be selected for use. Use is preferably made of glass having the properties of a thermal expansion coefficient in a range of 8.0 to $14.0 \times 10^{-6}$ $K^{-1}$, and a softening point in a range of 600 to 1000° C. As the electroconductive material mixed into the glass, use is made of a metal or an electroconductive oxide. As the metal, use is made of at least one kind of metal selected from the group consisting of Pt, Ag, Au, Ni, Co, W and Pd, that is, a metal containing one kind or not less than two kinds among those metals. As an example of the case of the metal containing not less than two kinds of those metals, there can be cited an alloy containing Ag, for example, an Ag—Pd base alloy, and so forth. As an example of the electroconductive oxide, there can be cited (a) a perovskite-type ceramic composed of not less than two elements selected from the group consisting of La, Cr, Y, Ce, Ca, Sr, Mg, Ba, Ni, Fe, Co, Mn, Ti, Nd, Pb, Bi, and Cu, (b) an oxide expressed by chemical formula (Ln, M) $CrO_3$ (in the chemical formula, Ln refers to lanthanoids, and M refers to Ba, Ca, Mg, or Sr), (c) an oxide expressed by chemical formula M $(Ti_{1-x} Nb_x)O_3$ (in the chemical formula, M refers to at least one element selected from the group consisting of Ba, Ca, Li, Pb, Bi, Cu, Sr, La, Mg, and Ce, x=0 to 0.4) and so forth.

The electroconductive material content of the mixture of the glass and the electroconductive material is preferably not less than 30 vol. % of the mixture, in which case the interconnector can maintain an excellent electroconductivity. Further, it is preferable that the mixture of the glass and the electroconductive material is subjected to a heat treatment at not higher than the melting point of the electroconductive material after the mixture is applied between the fuel electrode of one of adjacent cells and the air electrode of the other cell.

(2) an oxide containing Ti, expressed by, for example, chemical formula $M(Ti_{1-x} Nb_x)O_3$ (in the chemical formula, M refers to at least one element selected from the group consisting of Ba, Ca, Li, Pb, Bi, Cu, Sr, La, Mg, and Ce, x=0 to 0.4)

(3) a material composed mainly of Ag. In the case of this material, it is desirable to cover an interconnector made of this material with glass.

(4) a material composed of one substance or not less than two substances, selected from the group consisting of Ag, Ag solder, and a mixture of Ag and glass.

As the Ag solder, use is made of a metal soldering material containing at least Ag. Examples thereof include an Ag—Cu alloy (for example, Ag=71.0 to 73.0%, Cu=balance; 780 to 900° C.) (% refers to wt. %, temperature ° C. refers to soldering temperature; the same applies hereinafter), an Ag—Cu—Zn alloy (for example, Ag=44.0 to 46.0%, Cu=29.0 to 31.0%, Zn=23.0 to 27.0%; 745 to 845° C.), an Ag—Cu—Zn—Cd alloy (for example, Ag=34.0 to 36.0%, Cu=25.0 to 27.0%, Zn=19.0 to 23.0%, Cd=17.0 to 19.0%; 700 to 845° C.), an Ag—Cu—Zn—Sn alloy (for example, Ag=33.0 to 35.0%, Cu=35.0 to 37.0%, Zn=25.0 to 29.0%, Sn=2.5 to 3.5%; 730 to 820° C.), an Ag—Cu—Zn—Ni alloy (for example, Ag=39.0 to 41.0%, Cu=29.0 to 31.0%, Zn=26.0 to 30.0%, Ni=1.5 to 2.5%; 780 to 900° C.), and so forth.

There is no particular limitation to an application form of the Ag solder and the Ag solder can be used in the form of powders, slurry, sol, paste, sheet, or wire, and so forth. The slurry, sol, and paste can be prepared by dispersing, for example, the Ag solder in a powdery form, together with a binder, such as PVA, and so forth, into a solvent such as water, an organic solvent, and so forth. The sheet, and wire can be prepared by, for example, rolling a lump of the Ag solder. Use of the Ag solder in the form of the slurry, sol, or paste renders the operation advantageous.

When constituting the interconnector linking the fuel electrode to the air electrode between the respective cells adjacent to each other by use of the above-described constituent material of the interconnector, better mechanical, and electrical joining can be implemented at portions of the respective interconnectors, in contact with the fuel electrodes, and the electrolytes, by forming at least the portions thereof, in contact with the fuel electrodes, and the electrolytes, respectively, (that is, the portions of the interconnector, in contact with the fuel electrode and the electrolyte), or only those portions with the use of the material composed of one kind or not less than two kinds of material selected from the group consisting of the above-exemplified materials of i) Ag, ii) the material composed mainly of Ag, iii) the Ag solder, iv) the mixture of Ag and the glass, and v) the electroconductive oxide.

There are described hereinafter fabrication methods corresponding to structure, layout, and configuration, respectively, in sequence, for respective constituent members, such as the substrate, cells, interconnectors, and forth, of the SOFC module as the target for the method of manufacturing the SOFC module, according to the invention.

Construction of the SOFC Module as the Target for the Manufacturing Method According to the Invention Any SOFC module in which a multi-segment type cell layout is adopted can be a target for the method of manufacturing the SOFC module according to the invention. The SOFC module shown in FIG. 1 is an example of a hollow flat form, showing an external appearance, and the form and external appearance of the SOFC module of the multi-segment type are dependent mainly on a cross-sectional shape of the substrate thereof, and a length thereof, in the direction of fuel flow inside the substrate. Accordingly, with reference to the SOFC module as the target for the manufacturing method according to the invention, a structure of the substrate thereof is first described hereinafter.

Substrate Structure

As the substrate for the present invention, use is made of a substrate with an internal fuel flow part provided therein, at least a face thereof, in contact with cells, and interconnectors, being an insulator. More specifically, (1) the substrate is required to meet three requirements, namely, the substrate to be structured so as to have the internal fuel flow part therein, (2) the substrate to be structured so as to enable a plurality of cells to be disposed on the outer faces thereof, and (3) the substrate to be structured such that at least the face thereof, in contact with the cells and interconnectors, is the insulator, and it need only be sufficient that at least those requirements are met. The structure thereof can be polygonal (quadrilateral, flat rectangular, and so forth), tubular, elliptical, and other suitable forms, in cross-sectional shape. Besides the case where one unit of the internal fuel flow part is provided inside the substrate in any of those shapes, a plurality of units of the internal fuel flow parts can be provided therein.

Example 1

Of Substrate Structure

Figure 2:
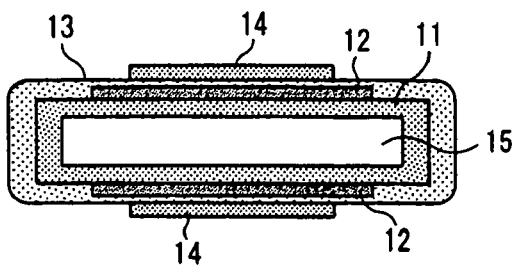
FIGS. 2(a) to 2(e), and FIGS. 3(a) to 3(b) are views showing examples of the structure according to this invention of "a substrate with an internal fuel flow part provided therein, at least a face thereof, in contact with cells, and interconnectors, being an insulator"
Figure 2:
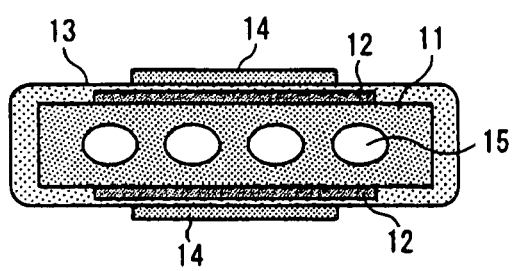
Figure 2:
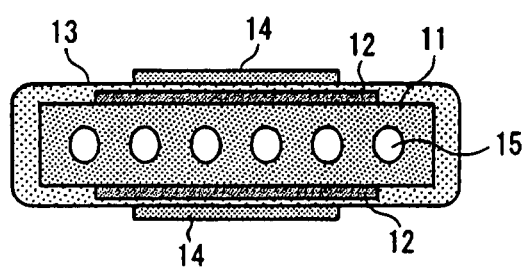
Figure 2:
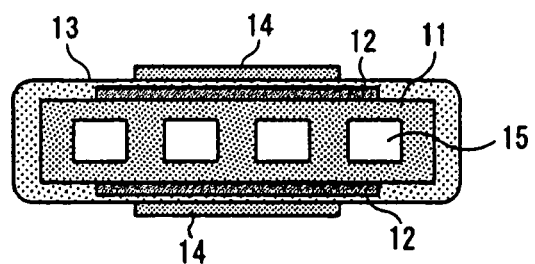
Figure 2:
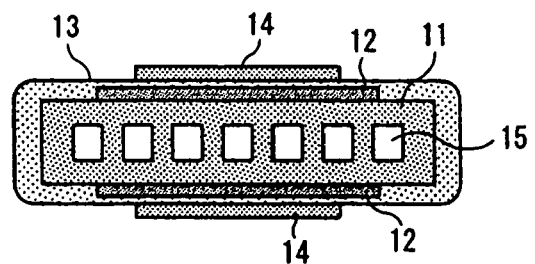
Figure 3:
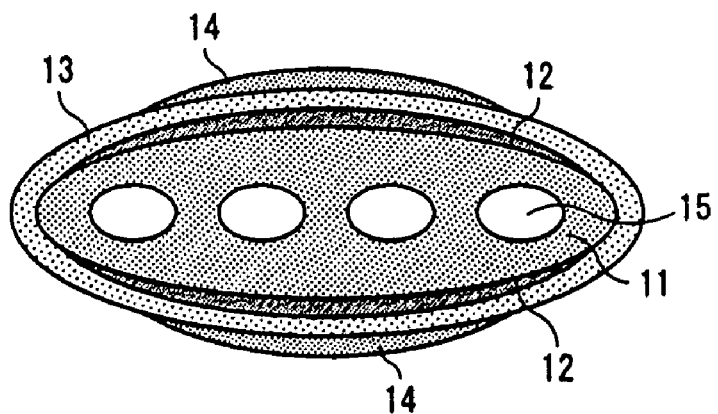
Figure 3:
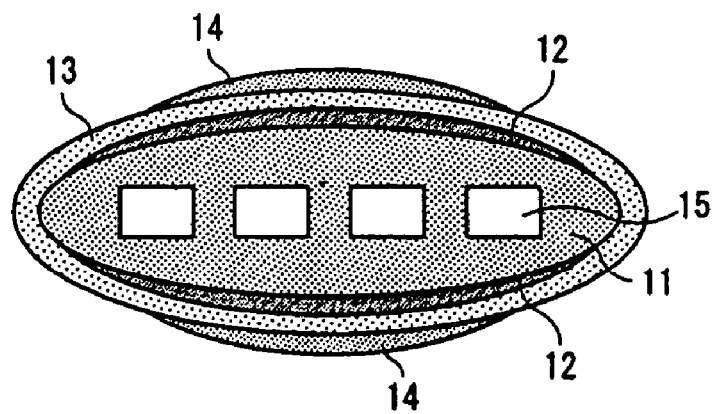

FIGS. 2(a) to 2(e) and FIGS. 3(a), 3(b) are views showing some examples of a substrate structure. With any of the examples shown in FIGS. 2(a) to 2(e), and 3(a) and 3(b), there are formed a plurality of cells each made up of a fuel electrode 12, an electrolyte 13, and an air electrode 14, stacked in sequence on top of an insulator substrate 11. Reference numeral 15 denotes a hollow region, that is, the internal fuel flow part. FIG. 2(a) shows an example of the insulator substrate hollow-rectangular or hollow-flat, in cross-section, showing the case of the insulator substrate 11 provided with one hollow region. The hollow region functions as a fuel flow path. FIGS. 2(b) to 2(e) are views showing examples of the insulator substrate rectangular or flat, in cross-section, respectively, showing the cases of the respective insulator substrates provided with a plurality of hollow regions, that is, a plurality of the fuel flow paths. FIGS. 2(b) and 2(c) are views showing examples of the respective fuel flow paths being circular or elliptical, in cross-section, and FIGS. 2(d) and 2(e) are views showing examples of the respective fuel flow paths being quadrilateral, or rectangular in cross-section. FIGS. 3(a) and 3(b) are views showing examples of the insulator substrate circular or elliptical, in cross-section, showing the cases of the respective insulator substrates being provided with a plurality of the fuel flow paths, FIG. 3(a) is a view showing an example of the respective fuel flow paths being circular or elliptical, in cross-section, and FIG. 3(b) is a view showing an example of the respective fuel flow paths being quadrilateral, or rectangular in cross-section. The cross-sectional shapes of the respective fuel flow paths are not limited to forms shown in those figures, and may be triangular or other suitable shapes.

Example 2

Of Substrate Structure

Figure 4:
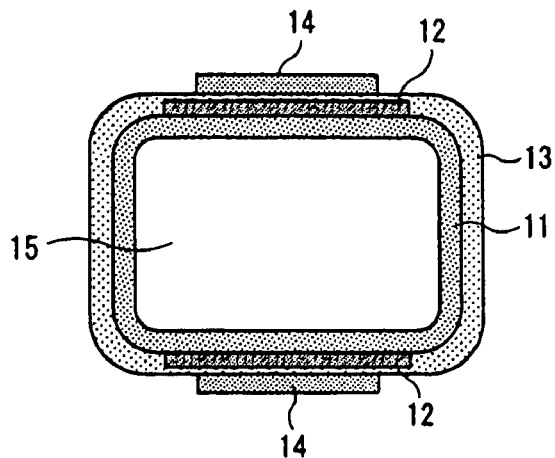
FIGS. 4(a) to 4(c) are views showing other examples of the structure according to this invention of "a substrate with an internal fuel flow part provided therein, at least a faces thereof, in contact with cells, and interconnectors, being an insulator"
Figure 4:
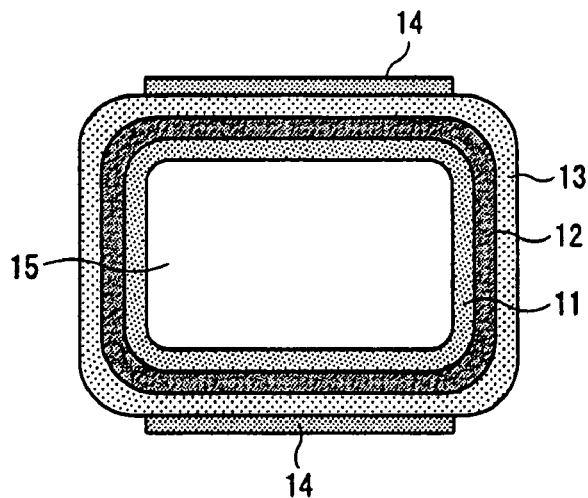
Figure 4:
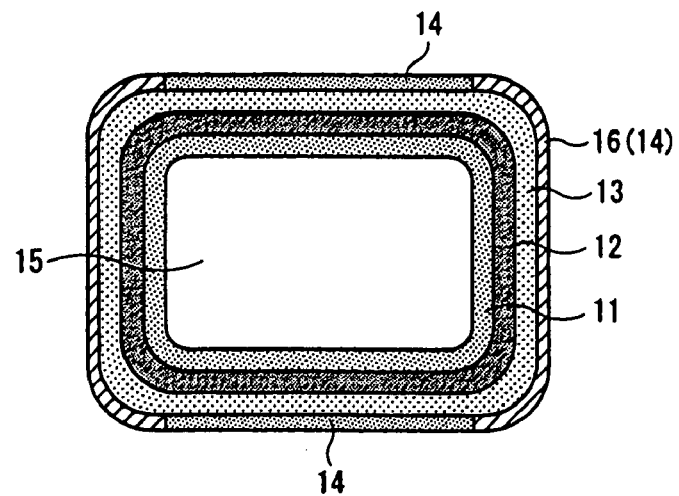

FIGS. 4(a) to 4(c) are views showing examples of the substrate structured so as to be quadrilateral or substantially quadrilateral in cross-section, respectively. With an example shown in FIG. 4(a), a fuel electrode 12 is disposed on both the upper side face, and the underside face of an insulator substrate 11, and an electrolyte 13 is disposed on the entire peripheral surface of the insulator substrate 11, including the fuel electrodes 12. Then, an air electrode 14 is disposed on portions of the surface of the fuel electrodes 12, corresponding to the respective fuel electrode 12, on the upper side, and underside. With the example shown in FIG. 4(a), the fuel electrode, and the air electrode may be disposed on both the right and left side faces of the insulator substrate 11, as well. With an example shown in FIG. 4(b), a fuel electrode 12 is disposed on the entire peripheral surface of an insulator substrate 11, and an electrolyte 13 is disposed on the entire peripheral surface of the fuel electrode 12. Then, an air electrode 14 is disposed on portions of the surface of the electrolyte 13, on the upper side, and underside, respectively. With an example shown in FIG. 4(c), a fuel electrode 12 is disposed on the entire peripheral surface of an insulator substrate 11, and an electrolyte 13 is disposed on the entire peripheral surface of the fuel electrode 12. Then, an air electrode 14 is disposed on portions of the surface of the electrolyte 13, on the upper side, and underside, respectively, and a conductor or an air electrode is disposed on portions of the surface of the electrolyte 13, other than the portions of the surface thereof, where the respective air electrodes 14 are disposed. In FIG. 4(c), the conductor or the air electrode that is disposed on the portions of the surface of the electrolyte 13, other than the portions where the respective air electrodes 14 are disposed, is indicated by "16 (14)". With the examples shown in FIGS. 4(b) and 4(c), the air electrode may be disposed on both faces of the electrolyte 13, on the right and left side of the fuel electrode, respectively, as well. In FIGS. 4(a) to 4(c), there are shown the cases of the substrate quadrilateral or substantially quadrilateral in cross-section, however, the same applies to the cases of the substrate being in a shape other than that in cross-section, such as other polygonal, elliptical, and so forth, in cross-section. In other respects, the substrate is the same in structure as that shown in FIGS. 1(a) to 3 (b).

Example 3

Of Substrate Structure

Figure 5:
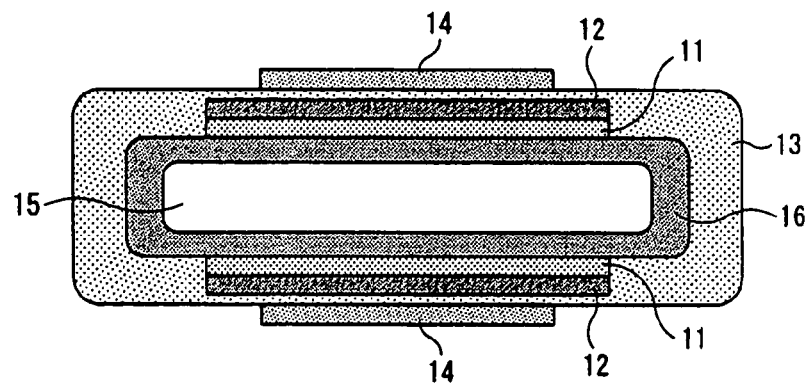
FIGS. 5(a) and 5(b) are views showing still other examples of the structure according to this invention of "a substrate with an internal fuel flow part provided therein, at least a faces thereof, in contact with cells, and interconnectors, being an insulator"
Figure 5:
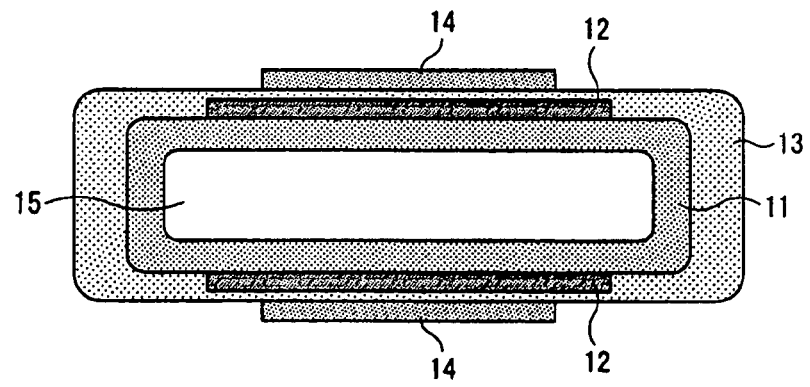

As the substrate for the present invention, use is made of a substrate with an internal fuel flow part provided therein, at least a face thereof, in contact with cells, and interconnectors, being an insulator. FIGS. 5(a) and 5(b) are views showing examples of the structure of the substrate meeting such a requirement, in which at least the face of the substrate, in contact with the cells, is an insulator. As shown in FIG. 5(a), portions of the substrate, in contact with respective fuel electrodes 12, are made up of an insulator 11 while another portion thereof is made up of an electrically conductive substance 16. This is the same as with the case where a face of the substrate, in contact with the interconnector between respective cells adjacent to each other, is an insulator. With the example of the structure, shown in FIG. 5(b), there is shown the case where a substrate in whole, including the faces thereof, in contact with cells, respectively, is made up of the insulator 11. In FIGS. 5(a) and 5(b), there are shown the cases of the substrate being in a shape rectangular or flat in cross-section, however, the same applies to the cases of the substrate being in a shape other than that in cross-section, such as other shapes polygonal, elliptical, circular, and so forth, in cross-section, as described in Examples 1 and 2 of Substrate Structure (refer to FIGS. 2(a) to 4(c)).

Structure of Cells Disposed on a Substrate Face

With the present invention, on the surface of the substrate described in the foregoing (Substrate Structure), that is, the substrate with the internal fuel flow part provided therein, at least the face thereof, in contact with the cells, and interconnectors, being the insulator, there are formed a plurality of cells each comprising a fuel electrode, an electrolyte, and an air electrode, stacked in sequence (that is, each cell is comprised of the fuel electrode, electrolyte, and air electrode, stacked in that order). There are described in sequence hereinafter examples of configuration of cells disposed on a substrate face.

Example 1

Of Configuration of Cells Disposed on a Substrate Face

A plurality of cells each comprising a fuel electrode, an electrolyte, and an air electrode, stacked in sequence, are formed on a substrate with an internal fuel flow part provided therein, at least a face thereof in contact with the cells and interconnectors being an insulator. With the invention, respective cell areas may be the same along the direction of fuel flow as shown in FIGS. 1(a) to 1(c), or may be varied along the direction of the fuel flow as shown hereunder (refer to Example 2 of Configuration of Cells Disposed on a Substrate Face). In this connection, a cell area generally refers to an effective power generation area of a cell, and since the effective power generation area of the air electrode or the effective power generation area of the fuel electrode, whichever is smaller, is rate-limiting, the cell area refers to the smaller one of those effective power generation areas.

Example 2

Of Configuration of Cells Disposed on a Substrate Face

Configuration whereby respective cell areas are varied along the direction of fuel flow has been developed by the inventor, et al., and by sequentially increasing the respective cell areas along the direction of the fuel flow, it is possible to sequentially decrease the current density and thereby enhancing the power generation efficiency. Further, since there is an increase in the number of electrical connections in series, voltage increases and conversion efficiency of conversion from direct current (DC) to alternating current (AC) can be enhanced.

Figure 6:
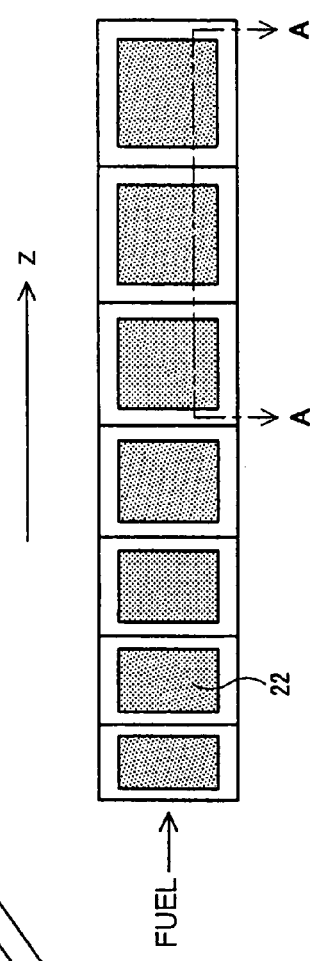
FIGS. 6(a) to 6(c) are views showing another example of an SOFC module structure according to the invention.
Figure 6:
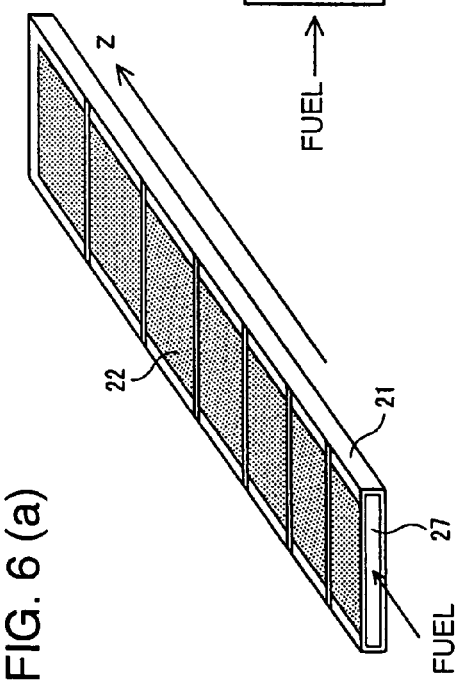
Figure 6:
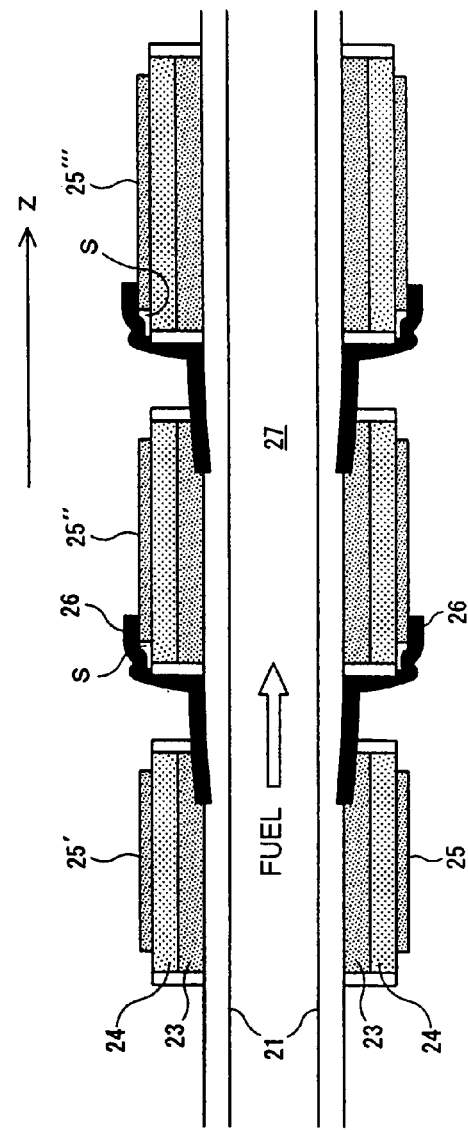

FIGS. 6(a) to 6(c) are views showing the configuration according to Example 2. FIG. 6(a) is a perspective view, FIG. 6(b) a plan view, and FIG. 6(c) a sectional view taken on line A-A in FIG. 6(b), showing the configuration expanded so as to be larger than that in FIG. 6(b). As shown in FIGS. 6(a) to 6(c), on either the upper side face or the underside face, or both the faces of a porous insulator substrate 21 in a hollow-flat shape in cross-section, with an internal fuel flow part 27 provided therein, at least the face thereof, in contact with respective cells 22, and interconnectors 26, being an insulator, there are formed in series a plurality of cells 22, each made up of a fuel electrode 23, an electrolyte 24, and an air electrode 25, stacked in sequence, and the cells 22 adjacent to each other are connected through the intermediary of the respective interconnectors 26.

In FIG. 6(c), the interconnector 26 is seen covering part of the surface of the air electrode 25, however, it may cover the entire surface thereof. Further, in FIG. 6(c), blank portions indicated by S may be filled with an interconnector material. In those respects described, the same applies to the Working Examples that will be described hereinafter.

Then, the configuration whereby the respective cell areas are varied along the direction of the fuel flow is adopted. In FIGS. 6(a) to 6(c), there is shown the case of the respective cell areas being sequentially increased along the direction of the fuel flow, as indicated by an arrow (→Z), illustrating a mode for varying the respective cell areas. More specifically, as indicated by 25', 25", 25''' in FIG. 6(c), the respective cells are structured such that the areas of the fuel electrode 23, and the areas of the electrolyte 24 are sequentially increased along the direction of the fuel flow, followed by a sequential increase in the area of the air electrode 25. Further, FIGS. 6(a) to 6(c) show the case of the substrate being in a hollow-flat shape or rectangular in cross-section, however, the same applies to the cases of the substrate being in shapes other than that in cross-section, such as polygonal, elliptical, and so forth, in cross-section.

Besides the above, as other modes for varying the respective cell areas along the direction of the fuel flow, the respective cells may be structured as described under items (1) to (3) given hereunder:

(1) One cell group is made up of a plurality of cells identical in cell area. The SOFC module is structured such that there are sequentially disposed cell groups with the respective cells thereof, sequentially increasing in cell area along the direction of the fuel flow. For example, there are disposed the respective cell groups in sequential order, such as the cell group a→the cell group b→. the cell group c . . . along the direction of the fuel flow, in which case, the cell areas of the respective cells of the cell group b are larger than those of the cell group a, the cell areas of the respective cells of the cell group c are larger than those of the cell group b, and so on.

(2) One cell group is made up of a plurality of cells identical in cell area. The SOFC module is structured such that there are sequentially, and alternately disposed the cell groups, and the cells not belonging to any of the cell groups (that is, individual cells) along the direction of the fuel flow while the cell areas of the respective cells are sequentially increased. For example, there are disposed the respective cell groups and the individual cells in a manner, such as the cell group a→the cell b→the cell group c→the cell d . . . along the direction of the fuel flow, in which case, the cell area of the cell b is larger than the cell areas of the respective cells of the cell group a, the cell areas of the respective cells of the cell group c are larger than the cell area of the cell b, and so on.

(3) One cell group is made up of a plurality of the cells identical in cell area. The SOFC module is structured such that there are disposed the cell groups, and the cells not belonging to any of the cell groups (that is, individual cells) sequentially along the direction of the fuel flow, but at random, while the cell areas of the respective cells are sequentially increased along the direction of the fuel flow. For example, the respective cell groups, and the individual cells are disposed in a manner, such as the cell group a→the cell b→the cell c→the cell group d→the cell e . . . along the direction of the fuel flow, in which case, the cell area of the cell b is larger than the cell areas of the respective cells of the cell group a, the cell area of the cell c is rendered larger than that of the cell b, the cell areas of the respective cells of the cell grouped are larger than that of the cell c, and so on.

Electric power is drawn out between the cell at the forefront in the direction of the fuel flow, and the cell at the rearmost in the direction of the fuel flow. As fuel is consumed at the respective cells, the fuel becomes gradually thinner along the direction of the fuel flow, however, in the case of Example 2 shown in FIGS. 6(a) to 6(c), the cell areas of the respective cells are sequentially increased, so that current density sequentially decreases. In this respect, the same applies to the cases of other modes described under items (1) to (3) as above. Accordingly, power generation efficiency can be enhanced. Further, since there is an increase in the number of the cells, of which adjacent cells are electrically connected in series, voltage increases, and conversion efficiency of conversion from direct current (DC) to alternating current (AC) can be enhanced.

Example 3

Of Configuration of Cells Disposed on a Substrate Face

Figure 7:
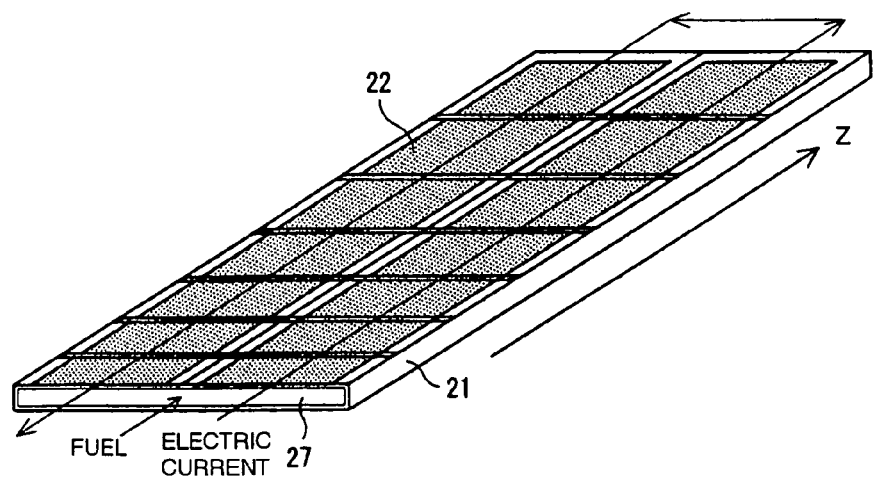
FIGS. 7(a) to 7(c) are views showing several examples of modes of structure, in which cells disposed in respective rows of an SOFC module are varied in cell area along the direction of fuel flow, by the row, respectively.
Figure 7:
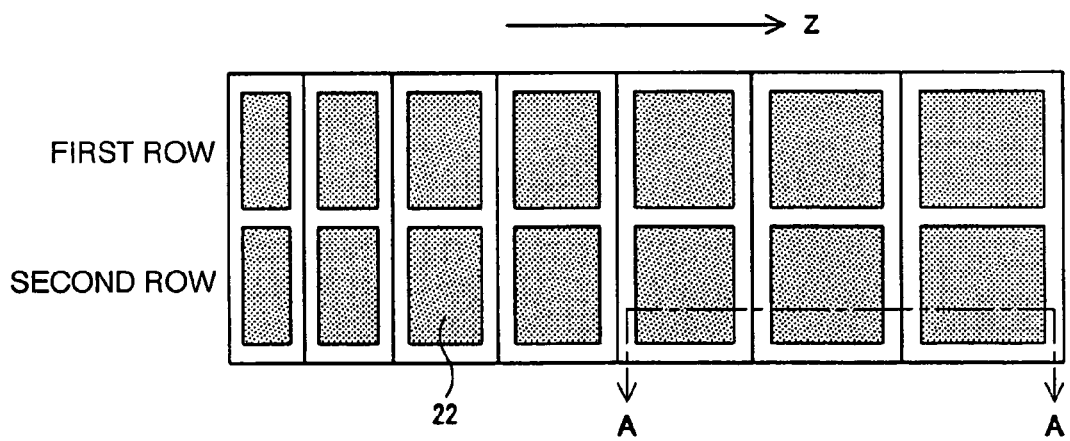
Figure 7:
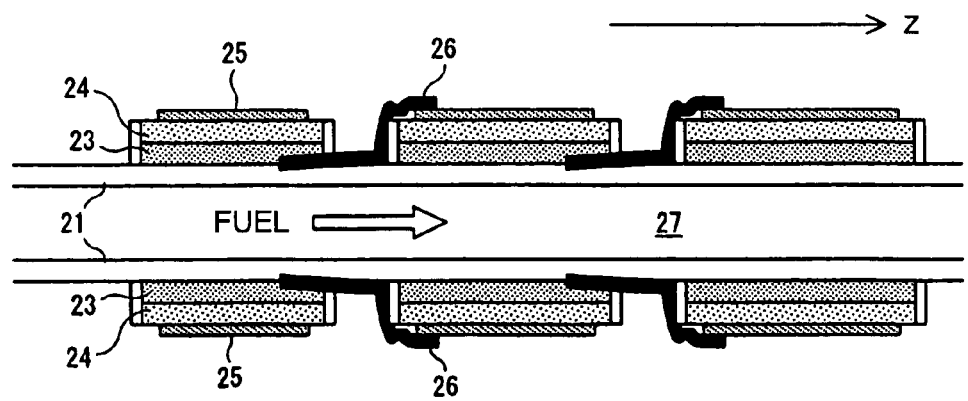

FIGS. 7(a) to 7(c) are views showing Example 3 of Configuration of Cells Disposed on a Substrate Face, as the target for the manufacturing method according to the invention. FIG. 7(a) is an oblique perspective view, FIG. 7(b) a plan view, and FIG. 7(c) a sectional view taken on line A-A in FIG. 7(b), showing the SOFC module expanded so as to be larger than that in FIG. 7(b). As shown in FIGS. 7(a) to 7(c), in each of a plurality of rows from the first to n-th rows, on either the upper side face or the underside face, or both the faces of an insulator substrate 21 in a rectangular or hollow-flat shape, in cross-section, there are formed a plurality of cells 22 each made up of a fuel electrode 23, an electrolyte 24, and an air electrode 25, stacked in sequence, and the adjacent cells 22 are electrically connected in series with each other through the intermediary of the respective interconnectors 26. In FIGS. 7(a) to 7(c), there is shown the case of two rows of the first and second rows, however, the same applies to the case of three or more rows. In FIG. 7(a), there is shown the direction of current flow between the cells on the top face (surface) of the SOFC module, however, the direction of current flow between the cells disposed on the underside face (rear face) of the SOFC module is the same.

Further, respective cell areas may be the same along the direction of fuel flow as shown in FIG. 1, however, the respective cell areas may be varied along the direction of the fuel flow as shown in FIGS. 6(a) to (c). In FIGS. 7(a) to 7(c), there is shown the case where the respective cells areas are sequentially increased along the direction of the fuel flow, as indicated by an arrow (→Z).

Besides the above, the respective cells may be structured as described under items (1) to (3) given hereunder, as with the previously described case (Example 2 of Configuration of Cells Disposed on a Substrate Face), on the basis of a sub-module unit in the respective rows:

(1) One cell group is made up of a plurality of the cells identical in cell area. The SOFC module is structured such that there are sequentially disposed the cell groups with the respective cells thereof, sequentially increasing in cell area along the direction of the fuel flow.

(2) One cell group is made up of a plurality of cells identical in cell area. The SOFC module is structured such that there are sequentially, and alternately disposed the cell groups, and the cells not belonging to any of the cell groups (that is, individual cells) along the direction of the fuel flow while the cell areas of the respective cells are sequentially increased.

(3) One cell group is made up of a plurality of the cells identical in cell area. The SOFC module is structured such that there are disposed the cell groups, and the cells not belonging to any of the cell groups (that is, individual cells) sequentially along the direction of the fuel flow, but at random, while the cell areas of the respective cells are sequentially increased along the direction of the fuel flow.

Further, the SOFC module may be structured such that cell areas of the respective cells disposed in the respective rows are varied along the direction of the fuel flow on a row-to-row basis, so as to be varied between the sub-module units. FIGS. 8(a), 8(b), and FIGS. 9(a), 9(b) are views showing several examples of such modes, respectively. In those figures, respective rows from first to fourth rows indicate respective sub-SOFC modules, omitting the description of the interconnectors. In those examples, a plurality of the sub-modules are disposed such that the faces thereof, with the cells disposed thereon, are in parallel with each other, and in those figures, to show a mode of cell lineup, there are shown the faces thereof, on the side of the cell lineup. Fuel is sequentially fed from the sub-module in the forefront row to the sub-module in the row adjacent thereto, and inside the sub-modules in the respective rows in FIGS. 8(a), 8(b), and FIGS. 9(a), 9(b), respectively, the fuel flows from the lower part to the upper part. In FIGS. 8(a), 8(b), and FIGS. 9(a), 9(b), reference numeral 28 denotes a fuel flow path through which the fuel is sequentially fed to the respective adjacent SOFC sub-modules. Further, those figures show the case of the SOFC module having four rows, however the same applies to the case of the SOFC module having two to three rows, or five or more rows.

The example shown in FIG. 8(a) represents the case where the cell areas of the respective cells are sequentially increased on the basis of the sub-module unit. In FIG. 8(a), the SOFC module is structured such that the cells areas of the respective cells 29 in the first row are small, the cell areas of the respective cells 29 in the second row, on the right side of the first row, are larger than those in the first row, the cell areas of the respective cells 29 in the third row, on the right side of the second row, are larger than those in the second row, and the cell areas of the respective cells 29 in the fourth row, at the right-hand end, are larger than those in the third row.

The example shown in FIG. 8(b) represents the case where the cell areas of respective cells are varied within a group of the cells, on a row-to-row basis, that is, within the sub-module unit, and further, the cell areas of respective cells are varied by the sub-module. In FIG. 8(b), the SOFC module is structured such that the respective cell areas of six cells 29 (a group of six cells identical in cell area), on the lower end sides of both the first row at the leftmost end, and the second row next to the first row, are smaller while the cell areas of five cells 29 (a group of five cells identical in cell area) positioned above the six cells 29 are larger than those of the six cells 29. With respect to the third row on the right side of the second row, four cells 29 (a group of four cells identical in cell area) on the lower end side thereof are structured so as to be smaller in cell area while five cells 29 (a group of five cells identical in cell area) positioned above the four cells 29 are structured so as to be larger in cell area than the four cells 29. With respect to the fourth row at the rightmost end, five cells 29 (a group of five cells identical in cell area) on the lower end side thereof are structured so as to be smaller in cell area while three cells 29 (a group of three cells identical in cell area) positioned above the five cells 29 are structured so as to be larger in cell area than the five cells 29.

Figure 9:
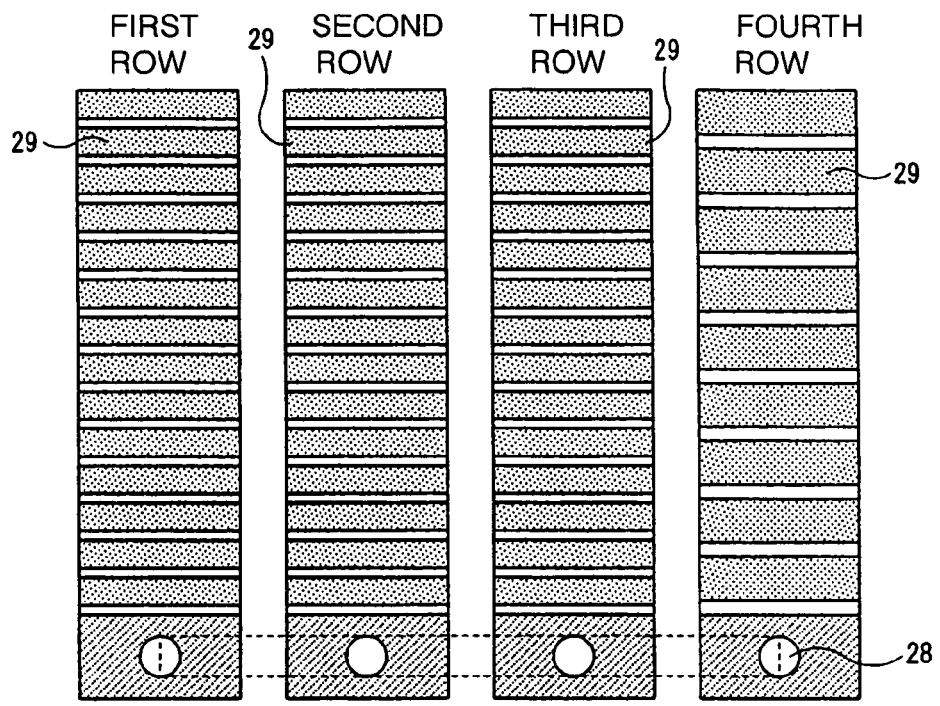
Figure 9:
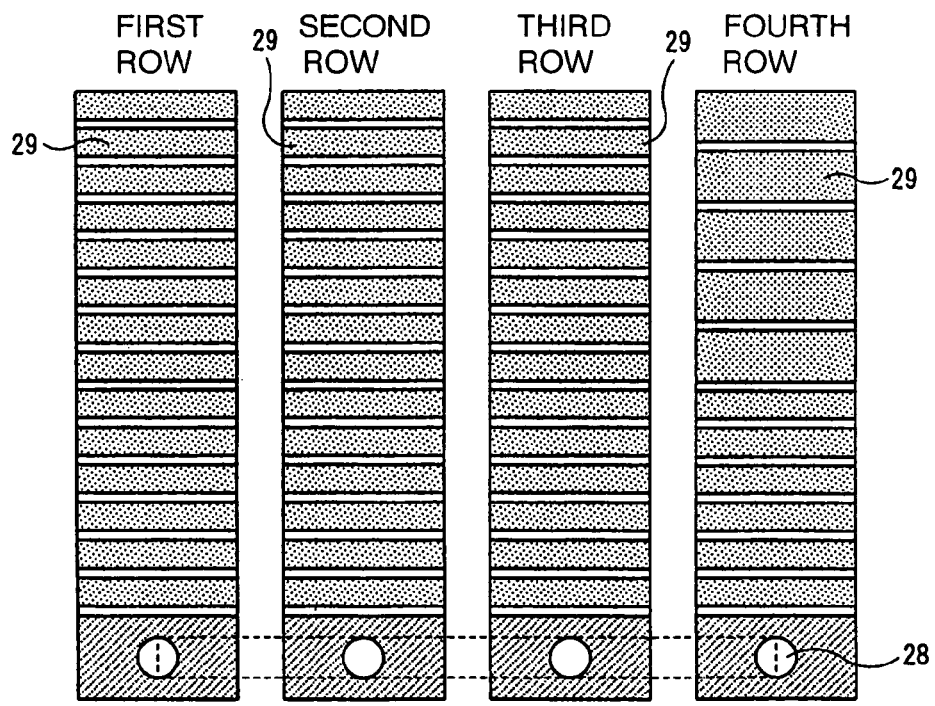

With the example shown in FIG. 9(*a*), respective cells 29 in respective rows from the first row at the leftmost end to the third row are structured so as to be identical in cell area while respective cells 29 in the fourth row are structured so as to be larger in cell area than the cells 29 in the respective rows from the first row to the third row. With the example shown in FIG. 9(*b*), respective cells 29 in respective rows from the first row at the leftmost end to the third row are structured so as to be identical in cell area, and with respect to respective cells 29 in the fourth row at the rightmost end, six cells 29 (a group of six cells identical in cell area) on the lower end side thereof are structured so as to be smaller in cell area while five cells 29 (a group of five cells identical in cell area) positioned above the six cells 29 are structured so as to be larger in cell area than the six cells 29.

Figure 8:
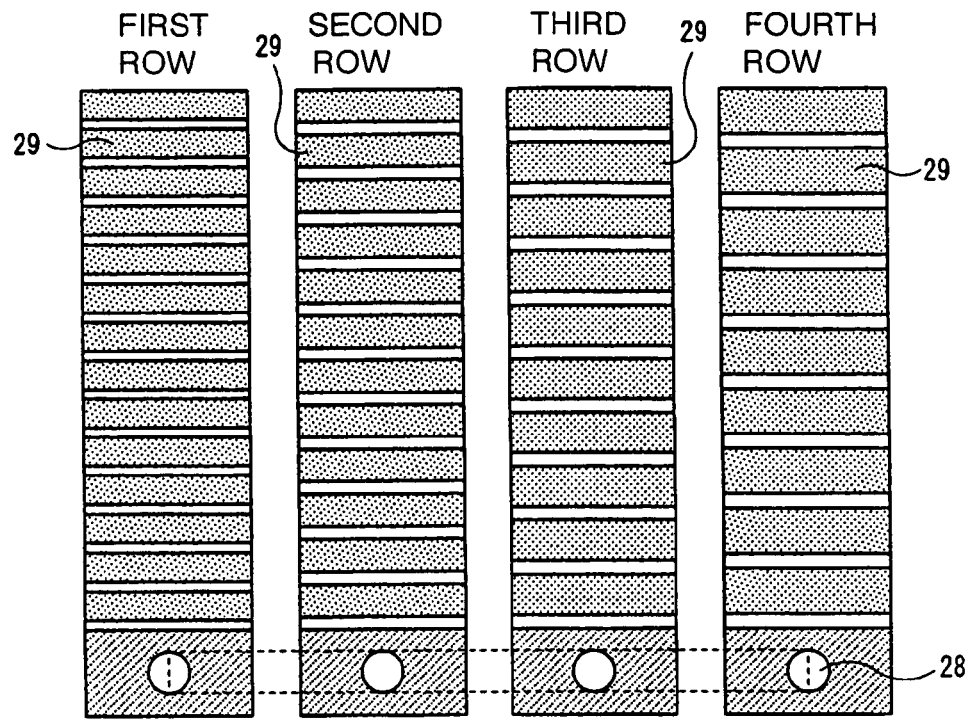
FIGS. 8(a), 8(b) and FIGS. 9(a), 9(b) are views showing several examples of modes of structure, in which cells disposed in respective rows of an SOFC module are varied in cell area along the direction of fuel flow, by the row, on the basis of an SOFC sub-module unit, respectively.
Figure 8:
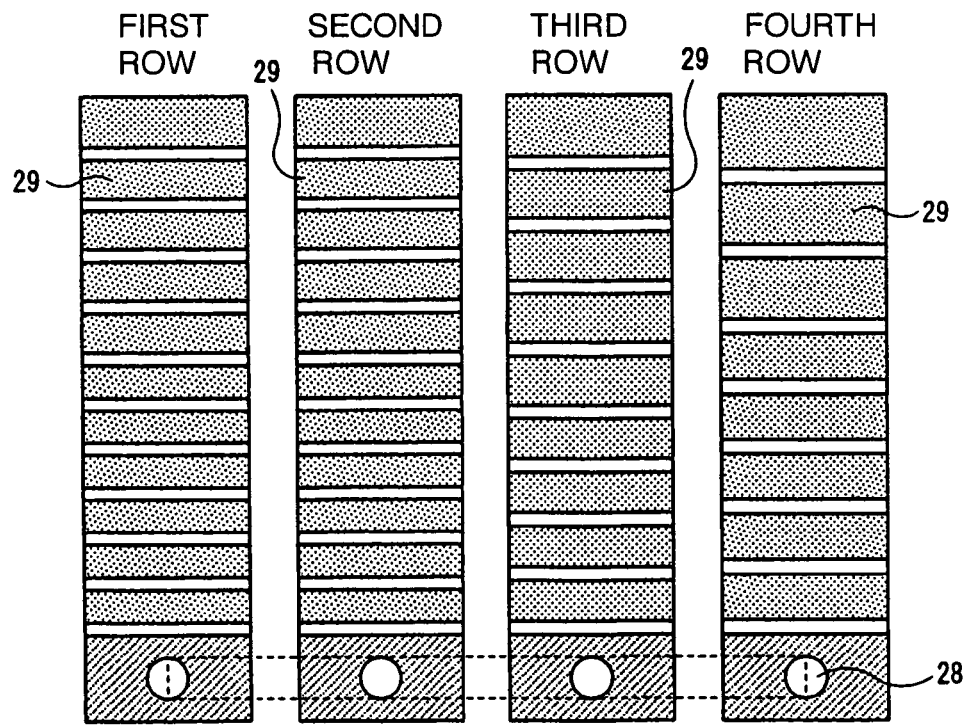

In the cases of the examples of modes shown in FIGS. 8(*a*), 8(*b*), and FIGS. 9(*a*), 9(*b*), respectively, electric power is drawn out between the cell of the first row, at the forefront in the direction of the fuel flow, and the cell of the fourth row, at the rearmost in the direction of the fuel flow. The fuel is consumed at the respective cells to thereby become gradually thinner along the direction of the fuel flow, however, since the respective cells or the respective air electrodes thereof are varied in cell area along the direction of the fuel flow on a cell group unit basis, or a sub-module unit basis, the same effect as that in the case of Example 2 of Configuration of Cells Disposed on a Substrate Face, as described hereinbefore, can be obtained. In addition, since the plurality of the cells are formed in each of the plurality of the rows from the first row to the n-th row, so as to be electrically connected in series, a multitude of the cells can be lined up. Accordingly, a large electric power can be obtained with a compact structure.

Process of Fabricating the SOFC Module by the Manufacturing Method According to the Invention When fabricating the SOFC module according to the manufacturing method of the invention, on the surface of the substrate with the internal fuel flow part provided therein, at least the face thereof, in contact with the cells, and interconnectors, being the insulator, there are formed a plurality of cells each comprising a fuel electrode, an electrolyte, and an air electrode, stacked in sequence. In that case, prior to the formation of the air electrode on the respective electrolytes, the co-sintered body is formed as previously described under Fundamental Features of the Invention (1) to (6).

Construction for Configuration of Interconnector Between Adjacent Cells

With the SOFC module structured as described in the foregoing, the interconnector is disposed between the adjacent cells. With the present invention, by use of a dense material, as the constituent material of the interconnector, in portions of the respective interconnectors, where gas-sealing performance is required, such as the portions thereof, between respective electrolytic films of the adjacent cells, and so forth, a coarse material can be used between the air electrode and the dense material. The interconnector is a conductor linking between the adjacent cells, that is, linking the air electrode of the preceding cell, with the fuel electrode of the immediately following cell, and can be structured in the shape of a sheet, wire, or in other appropriate shapes.

Herein, in the description of the present invention, the term "dense" in the dense material described as above means a state having a density corresponding to not less than 90%, preferably not less than 95% of the theoretical density of the material. In contrast, in the description of the present invention, the term "coarse" in the coarse material described as above means a state having density in a range of from 20% to less than 90% against the theoretical density of the material. With the present invention, it is essential to use the dense material, as the constituent material of the interconnector, at least between the respective electrolytic films of the adjacent cells, and on that premise, the dense material may be used in place of the coarse material at spots where the coarse material is used as described hereinafter.

If the constituent material of the interconnector is, for example, $(La,Sr)CrO_3$, this material has a poor sinterability, so that it is extremely difficult to implement fabrication of the interconnector out of the same, rendering it difficult to ensure gas-sealing performance. Accordingly, with the present invention, by use of the dense interconnector material, or the interconnector material turning dense by sintering, as the constituent material of the interconnector between the adjacent cells, at least in portions of the interconnector, coming into contact with the fuel electrode and the electrolyte, the dense interconnector is formed. As a result, gas-sealing performance is enhanced, thereby preventing gas from leaking between the interconnector, and the respective electrolytes. In addition, with the use of the dense material, electrical contact can be secured. Further, as described above, the coarse material can be used between the respective air electrodes and the dense material. By so doing, it is possible to obtain an advantageous effect that the fabrication of the interconnectors can be implemented concurrently with the formation of the air electrodes, or at a temperature lower than the sintering temperature for the air electrodes.

Figure 10:
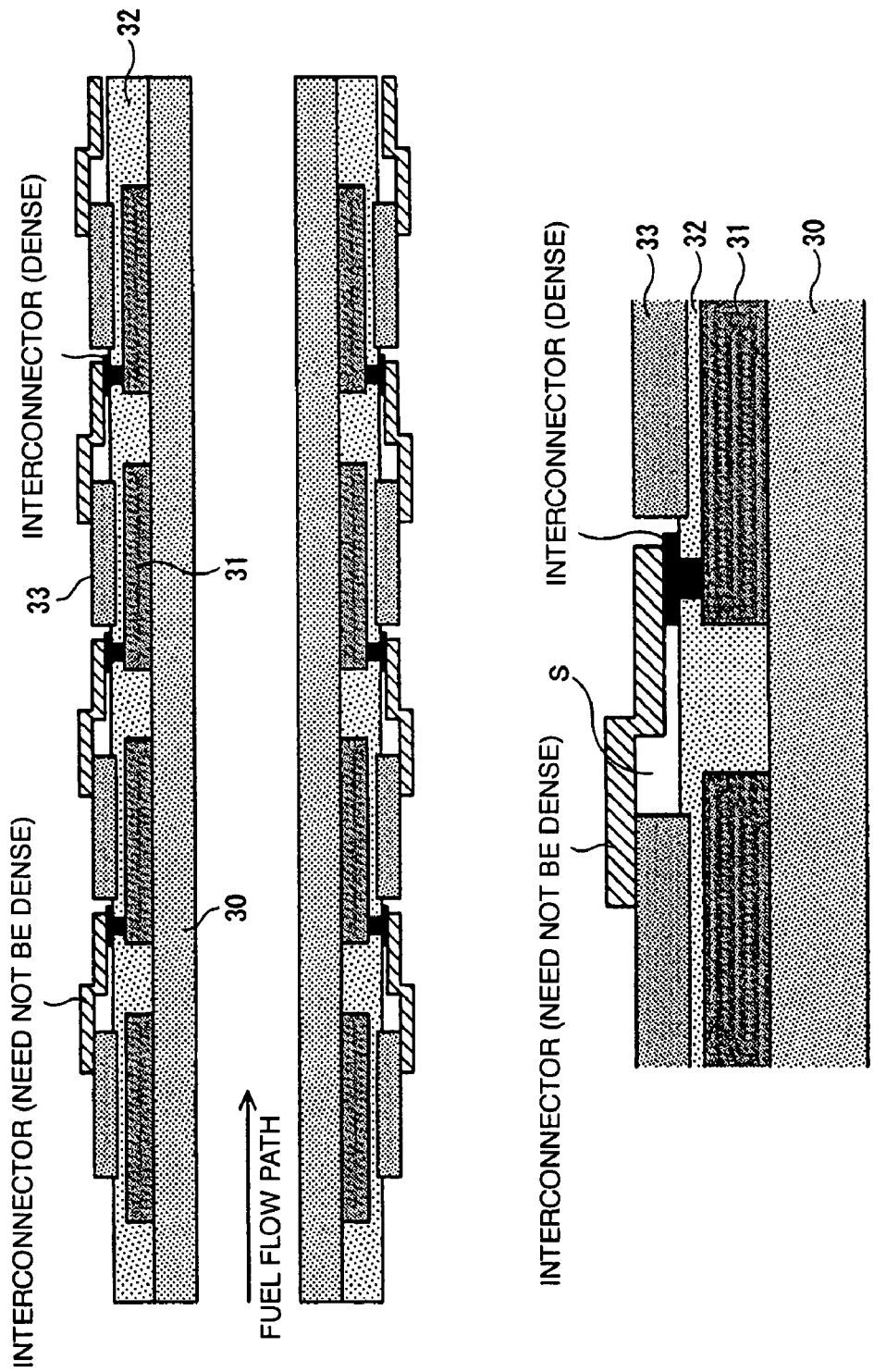
FIG. 10 is a view showing an interconnector configuration construction 1 according to the invention.

There are described in sequence hereinafter configuration constructions of the interconnectors between the respective cells adjacent to each other in the SOFC module fabricated according to the manufacturing method of the invention, and a process of fabricating the interconnectors (including the process for forming co-sintered body prior to the formation of air electrode on the electrolyte). FIG. 10 is a view showing an interconnector configuration construction and a basis of fabricating the same. In FIGS. 10 to 20, the lowest side views are those which enlarge a part of the upper side views. In FIGS. 10 to 20, a reference numeral 30 is a substrate, 31 a fuel electrode, 32 an electrolyte (film), 33 air electrode, and the air electrode 33 is disposed on the top face of the electrolyte film 32.

Interconnector Configuration Construction 1

FIG. 10 is a view showing an interconnector configuration construction 1. The underside face of the interconnector [in FIG. 10, a portion thereof, indicated as "interconnector (need not be dense)"] is normally in contact with the upper face of the electrolyte, however, there can be the case where spacing exists therebetween. FIG. 10 shows the case where the spacing exists therebetween, as indicated by S in the figure. In this respect, the same applies to FIGS. 11 to 15, and FIGS. 17 to 20, referred to hereinafter.

A dense interconnector is disposed between the adjacent cells (the respective cells disposed side by side in FIG. 10, the same applies to FIGS. 11 to 20, referred to hereinafter). With the present interconnector configuration construction 1, the dense material is used in portions of the respective interconnectors, coming into contact with the fuel electrode and the electrolyte, where gas-sealing performance is required, while the coarse material is used between the respective air electrodes and the dense material. In the case of a material composed mainly of an oxide expressed by, for example, chemical formula $(Ln,M)CrO_3$ (in the chemical formula, Ln refers to lanthanoids, and M refers to Ba, Ca, Mg, or Sr), this material has poor sinterability, so that it is extremely difficult to implement fabrication of the interconnector out of the same. Accordingly, as with the present interconnector configuration construction 1, by use of the dense material in the portions of the respective interconnectors, coming into contact with the fuel electrode and the electrolyte, where gas-sealing performance is required, gas-sealing performance can be enhanced, and gas can be prevented from leaking between the respective interconnectors, and the electrolytes. In addition, with the use of the dense material, electrical contact can be secured.

In general, the interconnector is linked with the respective fuel electrodes by disposing the interconnector underneath the respective fuel electrodes [refer to FIGS. 1(c), 6(c) and 7(c)]. In contrast, with the present configuration construction 1, by causing the dense interconnector material to be present on the upper faces of the respective fuel electrodes, as shown in FIG. 10, the fabrication can be facilitated. Further, as there is adopted the construction wherein parts of the respective electrolytes are covered by the interconnector, gas-sealing performance can be enhanced. In respect of the use of the coarse material between the respective air electrodes, and the dense material, the same applies to configuration constructions 2 to 11 that will be described hereinafter.

Now, on the premise that the dense interconnector material is disposed at specific spots as described above, the dense material may be used instead of the coarse material at spots where the coarse material is normally used. For example, in the case of using a mixture of glass and Ag (Ag serving as an electroconductive material) as the interconnector material, selection can be made as appropriate among (1) use of the mixture in the portions of the interconnectors [the portions thereof, indicated as "interconnector (need not be dense)" in FIG. 10], and use of the dense interconnector material other than the former, in the portions of the interconnectors, indicated as ["interconnector (dense)" in FIG. 10], (2) use of a dense mixture selected from the mixture, in the portions of the interconnectors, indicated as ["interconnector (dense)" in FIG. 10], and use of an interconnector material other than the former, in the portions of the interconnectors, the portions thereof, indicated as "interconnector (need not be dense)" in FIG. 10, (3) use of a dense mixture selected from the mixture, in both the portions of the interconnectors, indicated as "interconnector (dense)" and the portions of the interconnectors the portions thereof, indicated as "interconnector (need not be dense)", in FIG. 10, (4) use of a dense mixture selected from the mixture, in the portions of the interconnectors, indicated as "interconnector (dense)" in FIG. 10, and use of a coarse mixture selected from the mixture, in the portions of the interconnectors the portions thereof, indicated as "interconnector (need not be dense)", in FIG. 10, and so forth. In this respect, the same applies to Interconnector Configuration Construction 2 to 11, referred to hereinafter.

Fabrication of Interconnector Configuration Construction 1

A process of fabricating the interconnector configuration construction 1 is basically a process for co-sintering the respective fuel electrodes, the respective electrolytes, and the dense interconnector material, or the interconnector material turning dense by sintering, and subsequently, attaching the respective air electrodes thereto. In such a case, attachment of the interconnector material is carried out after the electrolyte is applied to the respective fuel electrodes. A co-sintered body of the fuel electrodes, and the electrolytes may be separately joined to the substrate through the intermediary of the joining material, and so forth, however, the co-sintered body thereof may be separately joined to the substrate through the intermediary of a joining material, and so forth, however, such co-sintering may be executed by co-sintering of those including the substrate. The process comprises the following steps:

(1) The fuel electrodes are disposed on the substrate. This step can be implemented, for example, by applying powdery constituent material of the fuel electrode, in slurry form, to the substrate.

(2) Portions of the respective fuel electrodes, to which the interconnector is to be attached, are masked in advance.

(3) Dipping with electrolyte is carried out. This step can be implemented, for example, by dipping, in other words, immersing a workpiece, having come through the steps (1) to (2) as above, into electrolytic slurry.

(4) The portions of the respective fuel electrodes are exposed by removing a mask.

(5) The dense interconnector material, or the interconnector material turning dense after co-sintering is subsequently attached so as to cover the portions of the respective fuel electrodes as exposed, and portions of the respective electrolytes, the portions of the interconnectors, indicated as "interconnector (dense)" in FIG. 10.

(6) The workpiece, having come through the steps (1) to (5) as above, is subjected to co-sintering. By so doing, the substrate, the fuel electrodes and the interconnectors are co-sintered, thereby forming the dense interconnectors. In the case of using the interconnector material turning dense after co-sintering, the dense interconnectors are formed after this co-sintering. In this respect, the same applies to the case of using the interconnector material turning dense after co-sintering with Interconnector Configuration Constructions as described hereinafter.

(7) The air electrodes are applied, and sintered.

(8) The coarse interconnector is attached, corresponding to the respective portions of the interconnectors, that is, the portions thereof, indicated as "interconnector (need not be dense)", in FIG. 10. The interconnector (need not be dense) is for linking the air electrode with the dense interconnector.

Interconnector Configuration Construction 2

Figure 11:
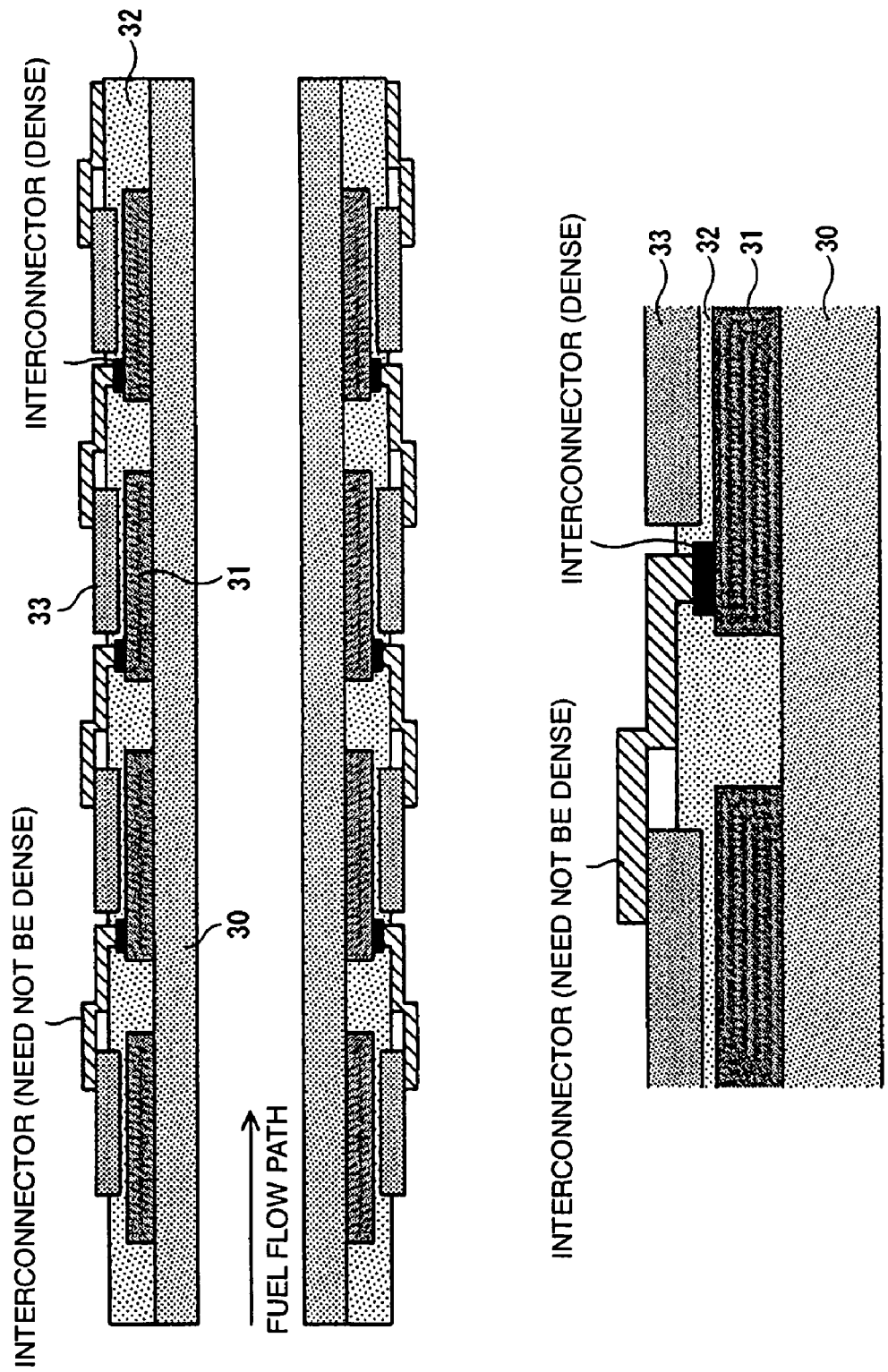
FIG. 11 is a view showing an interconnector configuration construction 2 according to the invention.

FIG. 11 is a view showing an interconnector configuration construction 2. A dense interconnector is disposed between the adjacent cells. With the interconnector configuration construction 2, the dense material is disposed on a part of the top face of the fuel electrode, and a portion of the dense material is linked with the coarse material. By so doing, there is made up a construction wherein the top of the dense material except a coarse material portion of the interconnector is covered by the electrolytes. As the interconnector configuration construction 2 has the construction wherein the top of the dense material is covered by the electrolytes, gas-sealing performance can be further enhanced. In other respects, the structure of the interconnector configuration construction 2 is the same as that for the interconnector configuration construction 1.

Fabrication of Interconnector Configuration Construction 2

A process of fabricating the interconnector configuration construction 2 is basically a process for co-sintering the respective fuel electrodes, the respective electrolytes, and the dense interconnector material, or the interconnector material turning dense by sintering, and subsequently, attaching the respective air electrodes thereto. Fabrication of the interconnector configuration construction 2 differs from fabrication of the interconnector configuration construction 1 in that prior to applying the electrolyte to the respective fuel electrodes in such a case, attachment of the interconnector material is carried out. A co-sintered body thereof may be separately joined to the substrate through the intermediary of a joining material, and so forth, however, such co-sintering may be executed by co-sintering of those including the substrate. The process comprises the following steps:

(1) The fuel electrodes are disposed on the substrate. This step can be implemented, for example, by applying powdery constituent material of the fuel electrode, in slurry form, to the substrate.

(2) The dense interconnector material, or the interconnector material turning dense after co-sintering is attached thereto. In order to attach the interconnector (need not be dense) to the interconnector material later on, the surfaces of respective portions of the interconnector material are masked.

(3) Dipping with electrolyte is carried out. This step can be implemented, for example, by dipping, in other words, immersing a workpiece, having come through the steps (1) to (2) as above, into an electrolytic slurry.

(4) A workpiece, having come through the steps (1) to (3) as above, is subjected to co-sintering. By so doing, the substrates, the fuel electrodes and the dense interconnector material, or the interconnector material turning dense after co-sintering are co-sintered. A mask may be removed prior to co-sintering or need not be removed in the case of using a masking material that will be decomposed dense upon the co-sintering.

(5) The air electrodes are applied, and sintered.

(6) The coarse interconnector is attached to the respective portions of the cells, that is, [the portions thereof, indicated as "(need not be dense)", in FIG. 11]. The interconnector (need not be dense) is for linking the air electrode with the dense interconnector.

Interconnector Configuration Construction 3

Figure 12:
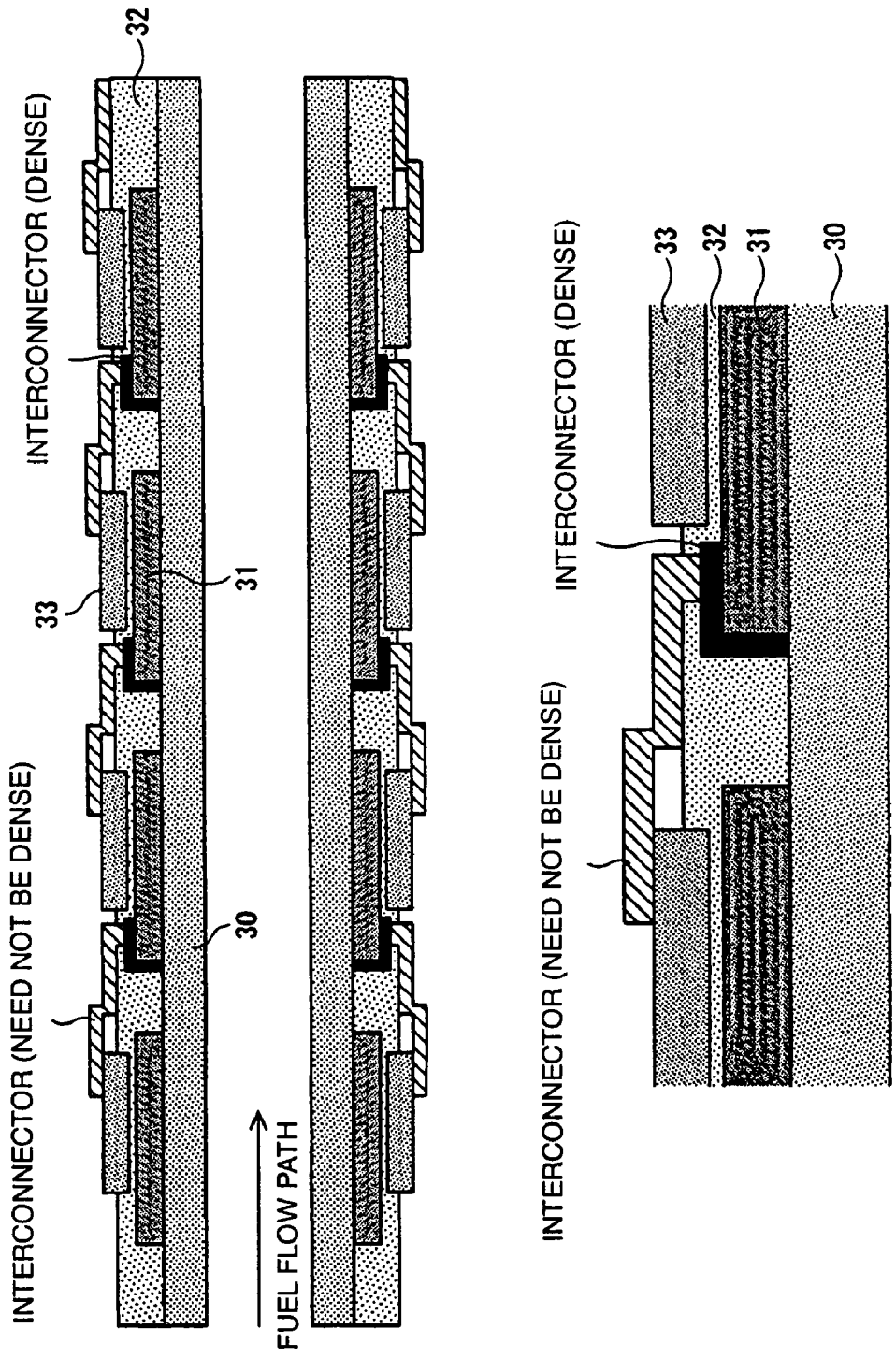
FIG. 12 is a view showing an interconnector configuration construction 3 according to the invention.

FIG. 12 is a view showing an interconnector configuration construction 3. The dense interconnector material is disposed between the adjacent cells. With the interconnector configuration construction 3, as shown in FIG. 12, the dense material is disposed between the top faces of the respective fuel electrodes, and an electrolyte film, and between the electrolyte film continuous thereto and side faces of the respective fuel electrodes (that is, the side faces thereof, on the upstream side of the respective cells, in the direction of the fuel flow) continuous to the top face. By so doing, a contact area between the dense interconnector material, and the respective electrolytes can be increased, thereby enabling contact resistance between the dense interconnector material, and the respective fuel electrodes to be lowered. In other respects, the structure of the interconnector configuration construction 3 is the same as that for the interconnector configuration construction 2.

Fabrication of Interconnector Configuration Construction 3

A process of fabricating the interconnector configuration construction 3 is basically a process for co-sintering the respective fuel electrodes, the respective electrolytes, and the dense interconnector material, or the interconnector material turning dense by sintering, and subsequently, attaching the respective air electrodes thereto. Fabrication of the interconnector configuration construction 3 is the same as the fabrication of the interconnector configuration construction 2, but differs from the fabrication of the interconnector configuration construction 2 in that prior to applying the electrolyte to the respective fuel electrodes in such a case, the portions of the interconnector material are masked. A co-sintered body thereof may be separately joined to the substrate through the intermediary of a joining material, and so forth, however, such co-sintering may be executed by co-sintering of those including the substrate. The process comprises the following steps:

(1) The fuel electrodes are disposed on the substrate. This step can be implemented, for example, by applying powdery constituent material of the fuel electrode, in slurry form, to the substrate.

(2) The dense interconnector material, or the interconnector material turning dense after co-sintering is attached thereto. Portions of the interconnector material are masked. Masking portions are spots where the coarse interconnector material is disposed in a step (6) described hereunder, that is, the top face of part of the respective portions of the interconnectors, indicated as "interconnector (dense)" in FIG. 12, and between portions indicated as the electrolytes, on the right and left sides, respectively.

(3) Dipping with electrolyte is carried out. This step can be implemented, for example, by dipping, in other words, immersing a workpiece, having come through the steps (1) to (2) as above, into an electrolytic slurry.

(4) A workpiece, having come through the steps (1) to (3) as above, is subjected to co-sintering. By so doing, the substrates, the fuel electrodes, the electrolytes, and the dense interconnector material, or the interconnector material turning dense after co-sintering are co-sintered.

(5) The air electrodes are applied, and sintered.

(6) The coarse interconnector is attached to the respective portions of the cells, that is, [the portions thereof, indicated as "(need not be dense)", in FIG. 12]. The interconnector (need not be dense) is for linking the air electrode with the dense interconnector.

Interconnectors Configuration Construction 4

Figure 13:
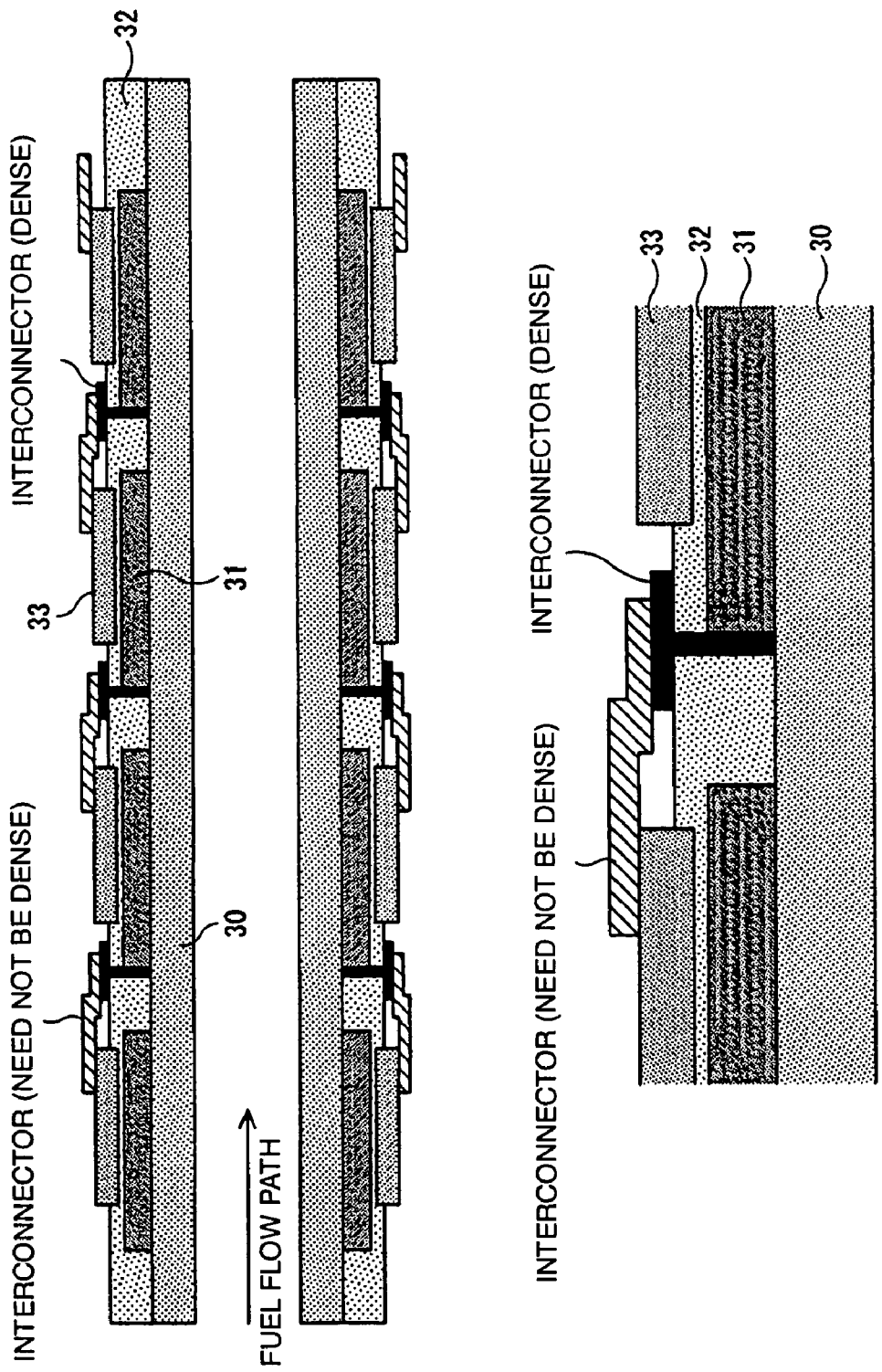
FIG. 13 is a view showing an interconnector configuration construction 4 according to the invention.

FIG. 13 is a view showing the interconnector configuration construction 4. The dense interconnector material is disposed between the adjacent cells. With the interconnector configuration construction 4, the dense interconnector material is disposed on the top faces of respective electrolytic films, adjacent to each other, and between the adjacent electrolytic films, and on side faces of the respective fuel electrodes, continuous to the former. As shown in FIG. 13, the dense material is in a sectional shape resembling the letter T, and the underside face of the head thereof is in contact with the respective electrolytes while one side face of the leg thereof (that is, a side face of the fuel electrode, on the upstream side of the respective cells, in the direction of the fuel flow) is in contact with the electrolyte and the fuel electrode continuing thereto, and the other side face of the leg thereof is in contact with the other electrolyte. By so doing, a contact area between the dense interconnector material, and the electrolytes can be increased, and contact resistance between the interconnector, and the fuel electrode can be lowered, thereby enabling sealing performance to be enhanced. In other respects, the structure of the interconnector configuration construction 4 is the same as that for the interconnector configuration construction 1.

Fabrication of Interconnector Configuration Construction 4

A process of fabricating the interconnector configuration construction 4 is basically a process for co-sintering the respective fuel electrodes, and the respective electrolytes, subsequently, attaching the dense interconnector material, or the interconnector material turning dense by sintering, and thereafter, attaching the respective air electrodes thereto. In this case, portions of the respective electrolytes, where the dense interconnector material, or the interconnector material turning dense by sintering is attached after co-sintering of the respective fuel electrodes, and the respective electrolytes, are etched away. A co-sintered body thereof may be separately joined to the substrate through the intermediary of a joining material, and so forth, however, such co-sintering may be executed by co-sintering of those including the substrate. The process comprises the following steps:

(1) The fuel electrodes are disposed on the substrate. This step can be implemented, for example, by applying powdery constituent material of the fuel electrode, in slurry form, to the substrate.

(2) Dipping with electrolyte is carried out. This step can be implemented, for example, by dipping, in other words, immersing a workpiece, having come through the step (1) as above, into an electrolytic slurry.

(3) The workpiece having come through the steps (1) to (2) as above, is subjected to co-sintering. By so doing, the substrates, the fuel electrodes and the electrolytes are co-sintered.

(4) The portions of the respective electrolytes, where the dense interconnector material, or the interconnector material turning dense by sintering is attached, are etched away. Etching spots correspond to the portions of the respective interconnectors, indicated as "interconnector (dense)", in FIG. 13.

(5) The dense interconnector material, or the interconnector material turning dense by sintering is attached. Attaching spots are the etching spots described above, corresponding to the portions of the respective interconnectors, indicated as "interconnector (dense)", in FIG. 13.

(6) The workpiece, having come through the step (5) as above, is subjected to firing (sintering). By so doing, the dense interconnectors are formed. In the case of using the interconnector material turning dense after co-sintering, the dense interconnectors are formed after this co-sintering. In this respect, the same applies to the case of using the interconnector material turning dense after co-sintering with Interconnector Configuration Constructions as described hereinafter.

(7) The air electrodes are applied, and sintered.

(8) The coarse interconnector is attached to the respective portions of the cells, indicated as (need not be dense) in FIG. 13. The coarse interconnector (need not be dense) is for linking the air electrode with the respective dense interconnectors.

Interconnector Configuration Construction 5

Figure 14:
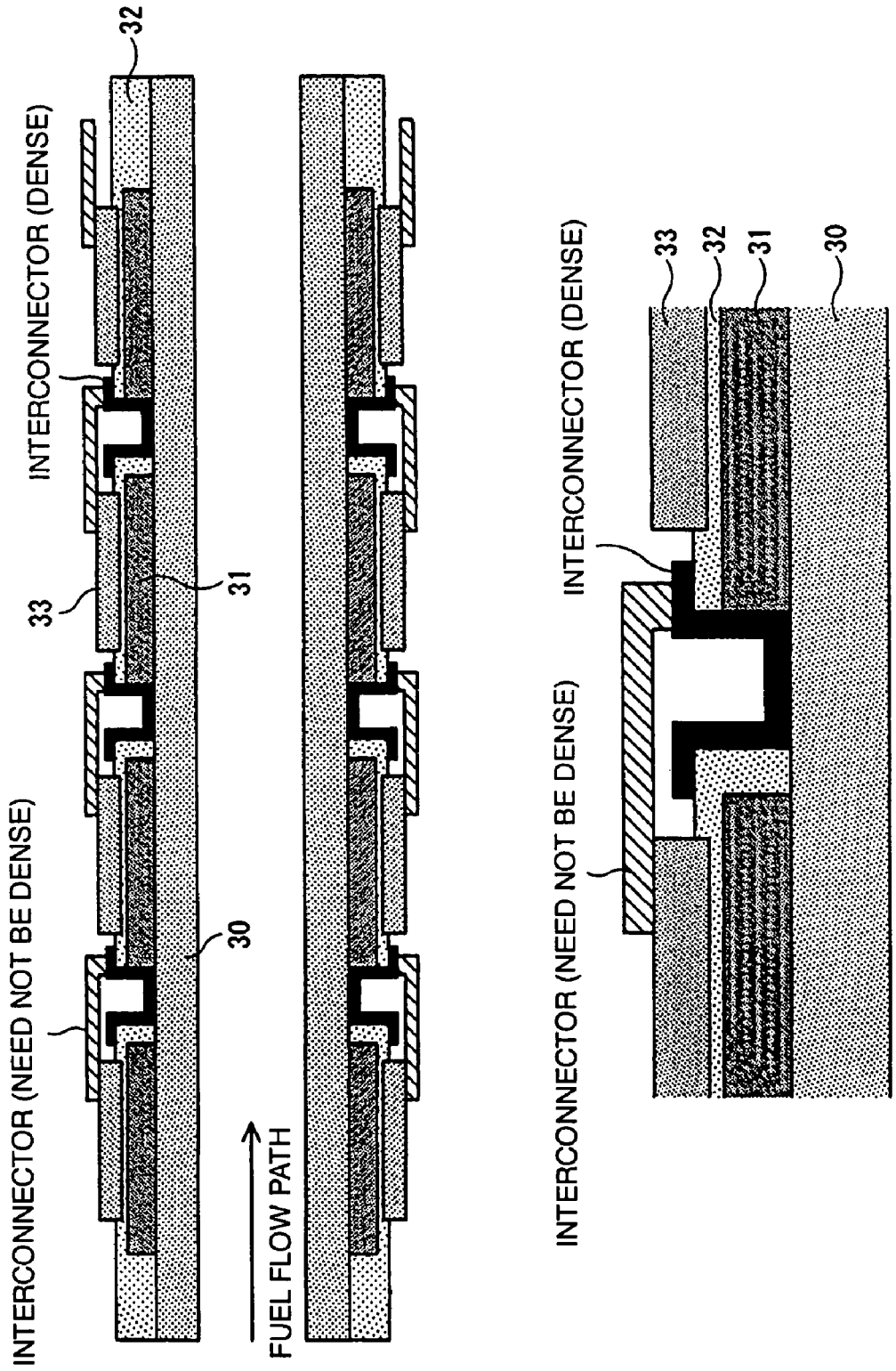
FIG. 14 is a view showing the interconnector configuration construction 5 according to the invention.

FIG. 14 is a view showing the interconnector configuration construction 5. The dense interconnector is disposed between the adjacent cells. With the interconnector configuration construction 5, the dense interconnector material is structured so as to continue from the top face of the electrolyte of the preceding cell of the adjacent cells to a side face of the electrolyte, coming into contact with the top face of the substrate, and to subsequently come into contact with a side face of the fuel electrode of the immediately following cell before further continuing to the top face thereof. As a result, the respective electrolytes can be more completely separated from each other in comparison with the case of the interconnector configuration construction 4. That is, the respective electrolytes of the adjacent cells are separated from each other. With the interconnector configuration construction 5, gas leakage from the substrate can be sealed with the dense interconnector material.

Fabrication of Interconnector Configuration Construction 5

A process of fabricating the interconnector configuration construction 5 is basically a process for co-sintering the respective fuel electrodes, and the respective electrolytes, subsequently, etching away portions of the respective electrolytes, where the dense interconnector material, or the interconnector material turning dense by sintering, disposing the dense interconnector material, or the interconnector material turning dense by sintering to be thereby sintered, and thereafter attaching the respective air electrodes thereto. A co-sintered body thereof may be separately joined to the substrate through the intermediary of a joining material, and so forth, however, such co-sintering may be executed by co-sintering of those including the substrate. The process comprises the following steps:

(1) The fuel electrodes are disposed on the substrate. This step can be implemented, for example, by applying powdery constituent material of the fuel electrode, in slurry form, to the substrate.

(2) Dipping with electrolyte is carried out. This step can be implemented, for example, by dipping, in other words, immersing a workpiece, having come through the step (1) as above, into an electrolytic slurry.

(3) The workpiece having come through the steps (1) to (2) as above, is subjected to co-sintering. By so doing, the substrates, the fuel electrodes and the electrolytes are co-sintered.

(4) The portions of the respective electrolytes, where the dense interconnector material, or the interconnector material turning dense by sintering is attached, are etched away. Etching spots correspond to the portions of the respective interconnectors, indicated as "[interconnector (dense)]", in FIG. 14.

(5) The dense interconnector material, or the interconnector material turning dense by sintering is attached.

(6) The air electrodes are applied thereto to be thereby sintered.

(7) The coarse interconnector is attached to the respective portions of the cells, indicated as (need not be dense) in FIG. 14. The coarse interconnector (need not be dense) is for linking the air electrode with the respective dense interconnectors.

Interconnector Configuration Construction 6

Figure 15:
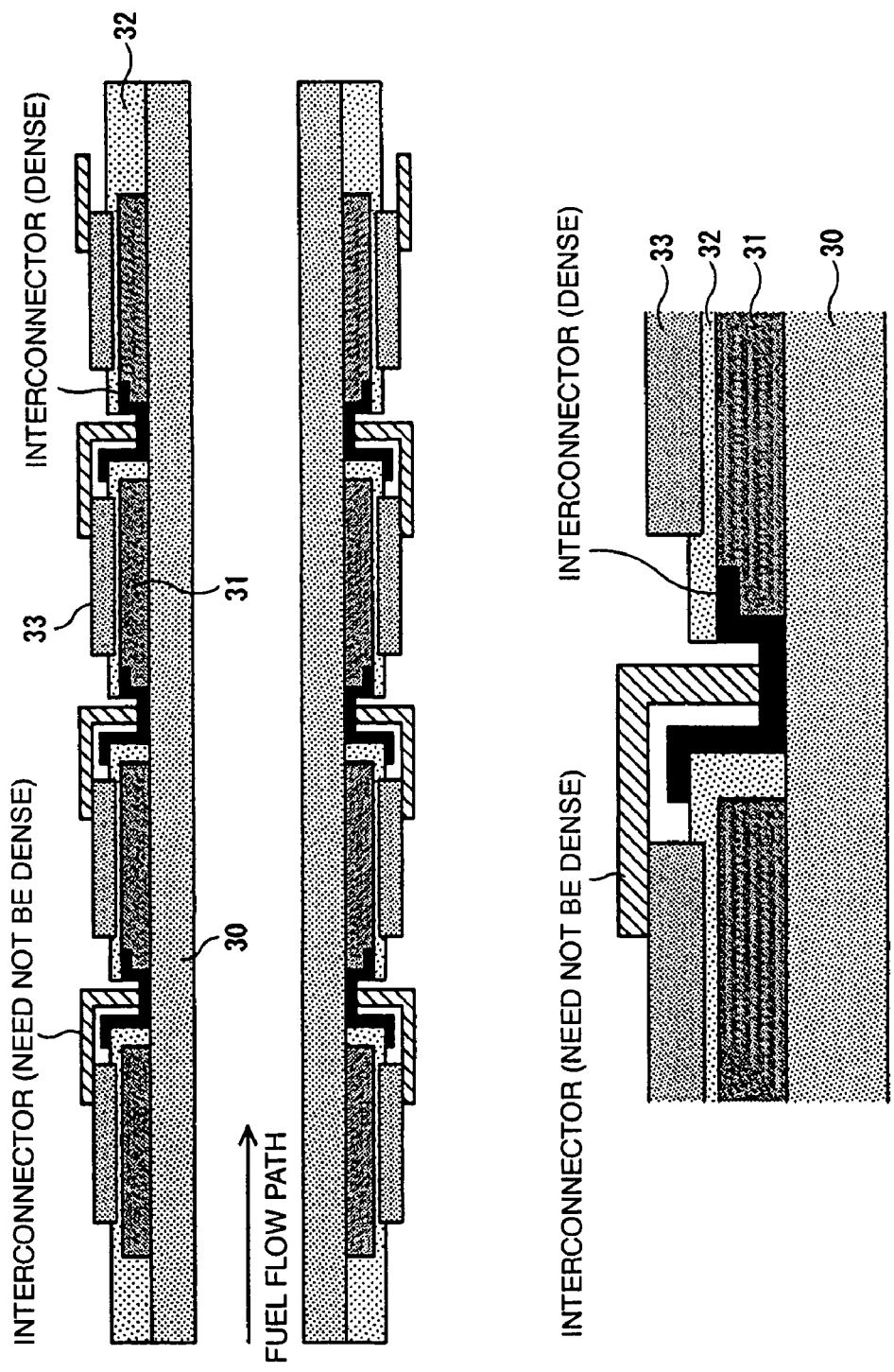
FIG. 15 is a view showing the interconnector configuration construction 6 according to the invention.

FIG. 15 is a view showing the interconnector configuration construction 6. The dense interconnector is disposed between the adjacent cells. With the interconnector configuration construction 6, the dense interconnector material is structured so as to continue from the top face of the electrolyte of the preceding cell of the adjacent cells to a side face thereof, coming in contact with the top face of the substrate, and to come into contact with a side face of the fuel electrode of the immediately following cell before continuing to between the top face of the fuel electrode and the underside face of the electrolyte. As a result, the respective electrolytes of the adjacent cells are separated from each other as with the case of the interconnector configuration construction 5. With the interconnector configuration construction 6, sealing performance against gas leakage even from a porous substrate can be enhanced with the dense interconnector material.

Fabrication of Interconnector Configuration Construction 6

A process of fabricating the interconnector configuration construction 6 is basically a process for co-sintering the respective fuel electrodes, the respective electrolytes, and the dense interconnector material, or the interconnector material turning dense by sintering, subsequently, attaching the air electrodes thereto, and linking the dense interconnector with the respective air electrodes. A co-sintered body thereof may be separately joined to the substrate through the intermediary of a joining material, and so forth, however, such co-sintering may be executed by co-sintering of those including the substrate. The process comprises the following steps:

(1) The fuel electrodes are disposed on the substrate. This step can be implemented, for example, by applying powdery constituent material of the fuel electrode, in slurry form, to the substrate.

(2) The electrolytes formed in a sheet shape, and the dense interconnector material, or the interconnector material turning dense by sintering, formed in a sheet shape, are alternately disposed so as to partially overlap each other. Overlapping portions each correspond to a spot on the top face of the fuel electrode of the following cell of the adjacent cells in FIG. 15.

(3) A workpiece having come through the steps (1) to (2) as above is subjected to co-sintering. By so doing, the fuel electrodes, the electrolytes, and the dense interconnector material, or the interconnector material turning dense by sintering are co-sintered.

(4) The air electrodes are applied thereto to be thereby sintered.

(5) The coarse interconnector is attached to the respective portions of the cells, indicated as (need not be dense) in FIG. 15. The coarse interconnector (need not be dense) is for linking the air electrode with the respective dense interconnectors.

Interconnector Configuration Construction 7

Figure 16:
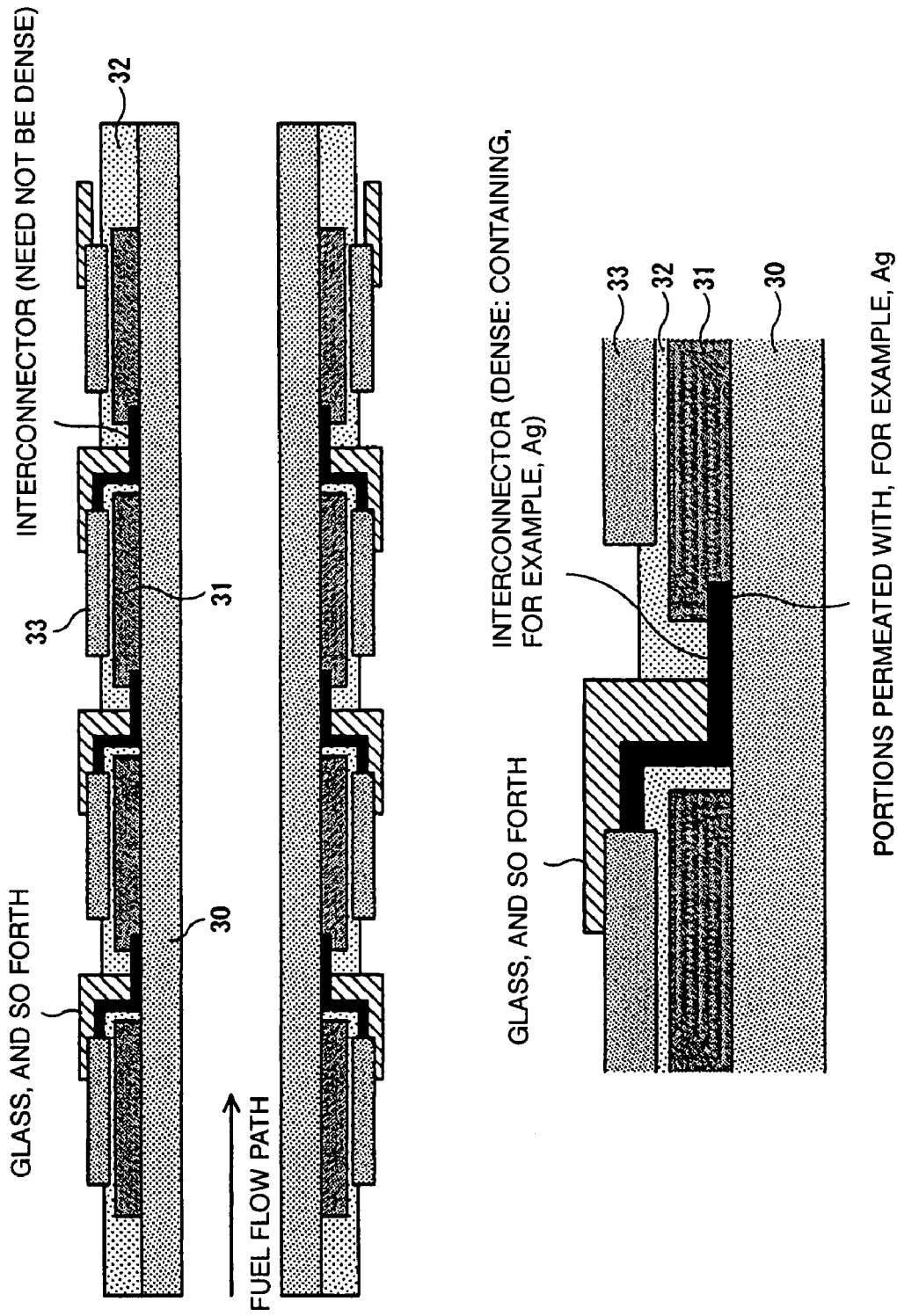
FIG. 16 is a view showing the interconnector configuration construction 7 according to the invention.

FIG. 16 is a view showing the interconnector configuration construction 7. The dense interconnector is disposed between the adjacent cells. With the interconnector configuration construction 7, the electrolytes of the respective cells are disposed so as to cover the fuel electrode including a side face thereof. With the interconnector configuration construction 7, the dense interconnector material is structured so as to continue from a side face of the air electrode of the preceding cell of the adjacent cells to the top face of the electrolyte, coming in contact with a side face thereof, and to subsequently come into contact with the top face of the substrate, further continuing to between the underside face of the electrolyte of the immediately following cell, and the substrate before further extended between the substrate and the fuel electrode. As a result, the respective electrolytes of the adjacent cells are separated from each other. With the interconnector configuration construction 7, sealing performance against gas leakage even from a porous substrate can be enhanced with the dense interconnector material. In the case where the dense interconnector material is composed of, for example, an Ag-containing material, there can be times when Ag is scattered if Ag is in single substance form. Accordingly, with the interconnector configuration construction 7, the top of the Ag-containing material is covered with a glass material, and so forth, as shown in FIG. 16, thereby preventing scattering of Ag.

Fabrication of Interconnector Configuration Construction 7

A process of fabricating the interconnector configuration construction 7 is basically a process for co-sintering the substrate, the respective fuel electrodes, and the respective electrolytes, subsequently, etching away portions of the respective electrolytes, and portions of the respective fuel electrodes, to which the dense interconnector material, or the interconnector material turning dense by sintering is applied, disposing the dense interconnector material, or the interconnector material turning dense by sintering to be thereby sintered, and thereafter attaching the respective air electrodes thereto. The process comprises the following steps:

(1) The fuel electrodes are disposed on the substrate. This step can be implemented, for example, by applying powdery constituent material of the fuel electrode, in slurry form, to the substrate.

(2) Dipping with electrolyte is carried out. This step can be implemented, for example, by dipping, in other words, immersing a workpiece, having come through the step (1) as above, into an electrolytic slurry.

(3) A workpiece having come through the steps (1) to (2) as above, is subjected to co-sintering. By so doing, the substrates, the fuel electrodes and the electrolytes are co-sintered.

(4) The portions to which the dense interconnector material, or the interconnector material turning dense by sintering is attached, are etched away. Etching spots correspond to portions indicated as the interconnectors (dense: for example, containing Ag), in FIG. 16, that is, portions each extending from a side face of the air electrode of the preceding cell of the adjacent cells to the top face, and a side face of the electrolyte, and the top face of the substrate, up to between the underside face of the electrolyte of the immediately following cell, and the substrate.

(5) The dense interconnector material, or the interconnector material turning dense by sintering is attached. The reason why the dense interconnector material is permeated up to the respective fuel electrodes, as shown in FIG. 16, for example, as Ag-permeated portions, is that elements, for example, Ag undergo natural permeation.

(6) The air electrodes are applied thereto to be thereby sintered.

(7) The top of the Ag-containing material as formed is covered with a glass material, and so forth, in the case of using an Ag-containing material for the dense interconnector material, thereby preventing scattering of Ag. Parts indicated as "Ag-containing material etc." in FIG. 16 correspond thereto.

Interconnector Configuration Construction 8

Figure 17:
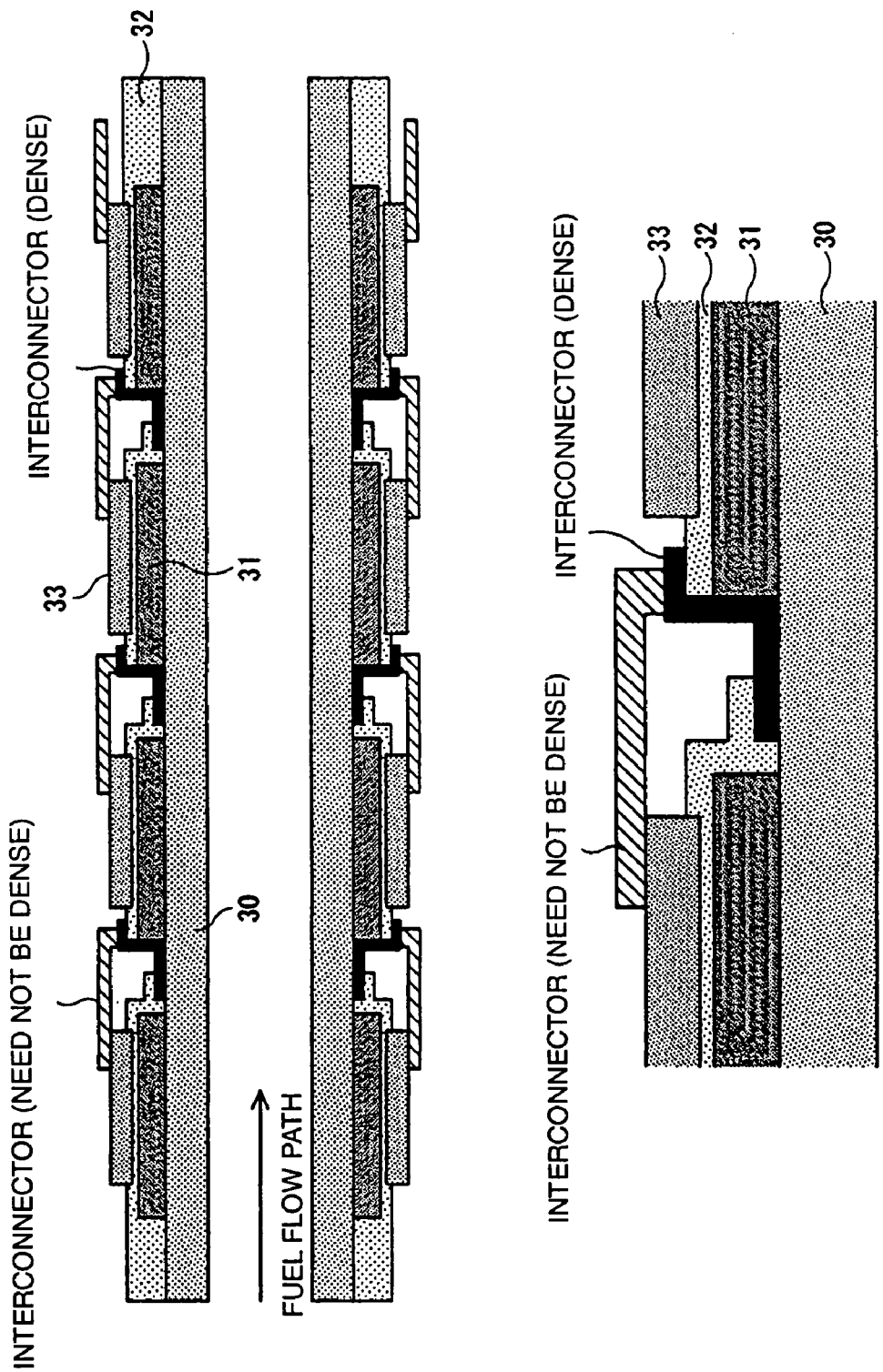
FIG. 17 is a view showing the interconnector configuration construction 8 according to the invention.

FIG. 17 is a view showing the interconnector configuration construction 8. The dense interconnector is disposed between the adjacent cells. As shown in a sectional view of FIG. 17, with the interconnector configuration construction 8, respective cells are structured as seen in section such that a side face of the both side faces of the fuel electrode, on the upstream side of fuel flow, is not covered with the electrolyte while the other side face of the fuel electrode, on the downstream side of the fuel flow, is covered with the electrolyte, and the electrolyte further covers the top face of the substrate. Further, the dense interconnector is structured so as to continue from the electrolyte on the top face of the substrate (between the electrolyte and the top face of the substrate), coming in contact with the top face of the substrate to a side face of the fuel electrode of the immediately following cell before coming into contact with the top face of the electrolyte. As a result, the respective electrolytes of the adjacent cells are separated from each other. With the interconnector configuration construction 8, the electrolytes are completely separated from each other, that is, the respective electrolytes of the adjacent cells are separated from each other, and by disposing the dense interconnector on the top face of the electrolyte, on the side of the cell, adjacent to the fuel electrode with which the dense part comes into contact, sealing performance can be enhanced. Further, since the electrolyte covers between the side face of the fuel electrode, on the downstream side of the fuel flow, and the top face of the substrate, sealing performance can be enhanced.

Fabrication of Interconnector Configuration Construction 8

A process of fabricating the interconnector configuration construction 8 is basically a process for co-sintering the substrate, the respective fuel electrodes, the dense interconnector material, or the interconnector material turning dense by sintering, and the respective electrolytes before attaching the respective air electrodes thereto. The process comprises the following steps:

(1) The fuel electrodes are disposed on the substrate. This step can be implemented, for example, by applying powdery constituent material of the fuel electrode, in slurry form, to the substrate.

(2) The dense interconnector material, or the interconnector material turning dense by sintering, formed in a sheet shape, is attached. Attaching spots correspond to portions indicated as the interconnector (dense) in FIG. 17.

(3) The electrolytes formed in a sheet shape are disposed. In this case, in relation to the fuel electrodes, the electrolytes formed in a sheet shape are disposed between the top face of the fuel electrodes, and the underside of dense interconnector material, or the interconnector material turning dense by sintering.

(4) A workpiece having come through the steps (1) to (3) as above is subjected to co-sintering. By so doing, the substrate, the fuel electrodes, the dense interconnector material, or the interconnector material turning dense by sintering, and the electrolytes, are co-sintered.

(5) The air electrodes are applied thereto to be thereby sintered.

(6) The coarse interconnector is attached to the respective portions of the cells, indicated as the interconnector (need not be dense) in FIG. 17. The interconnector (need not be dense) is for linking the air electrode with the respective dense interconnectors.

Interconnectors Configuration Construction 9

Figure 18:
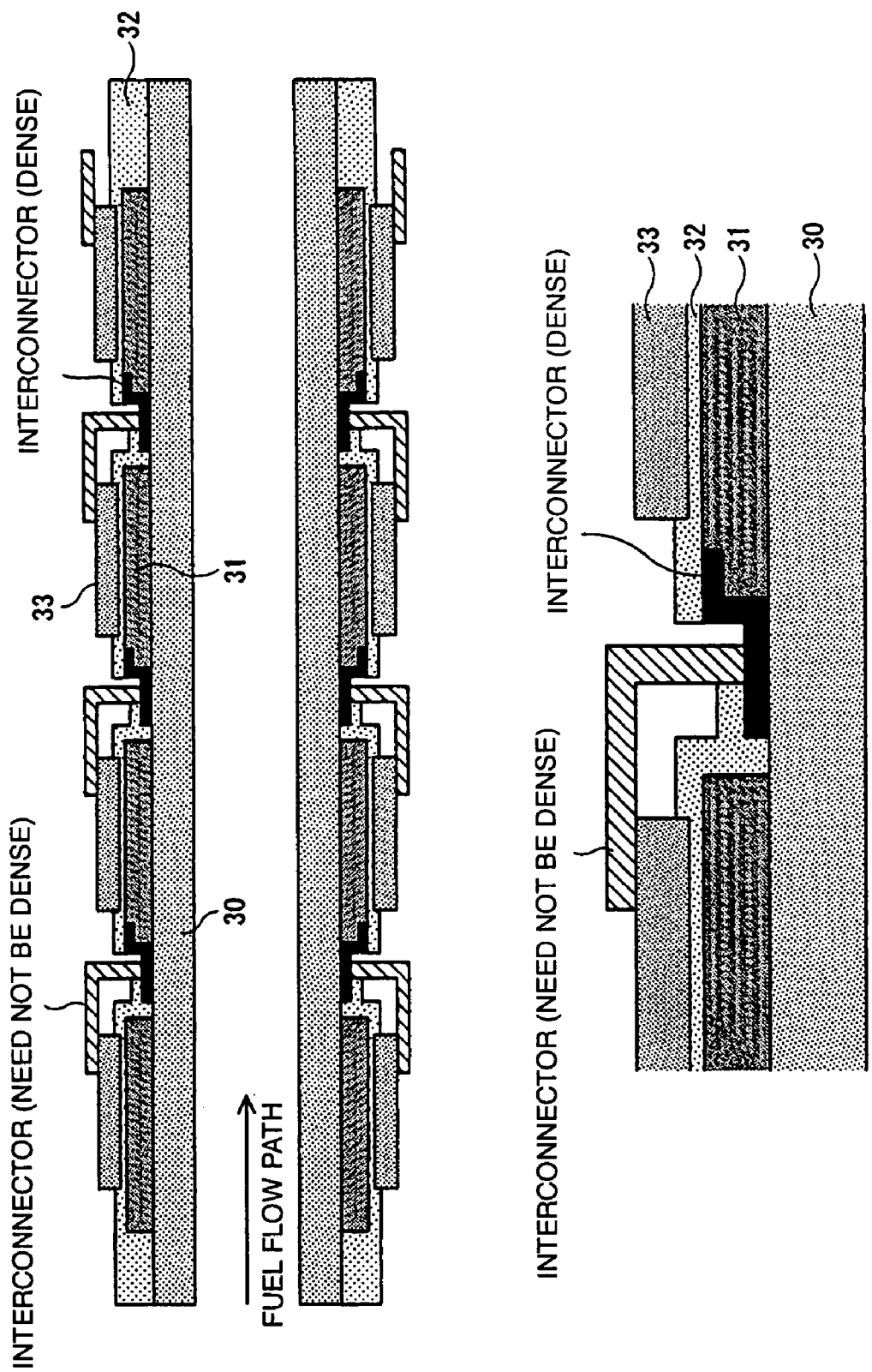
FIG. 18 is a view showing the interconnector configuration construction 9 according to the invention.

FIG. 18 is a view showing the interconnector configuration construction 9. The dense interconnector is disposed between the adjacent cells. As shown in FIG. 18, with the interconnector configuration construction 9, the respective cells are structured as seen in section such that a side face of the both side faces of the fuel electrode, on the upstream side of fuel flow, is not covered with the electrolyte while the other side face of the fuel electrode, on the downstream side of the fuel flow, is covered with the electrolyte, and the electrolyte covers the top face of part of the substrate. Further, the dense interconnector is structured so as to continue from the electrolyte on the top face of the part of the substrate (between the top face of the substrate and the electrolyte), coming into contact with the top face of the substrate, and further continuing to a side face of the fuel electrode of the immediately following cell before coming into contact with the underside face of the electrolyte (that is, between the underside face of the electrolyte and the fuel electrode). As a result, the respective electrolytes of the adjacent cells are separated from each other. With the interconnector configuration construction 9, the electrolytes are completely separated between the respective cells, that is, the respective electrolytes of the adjacent cells are completely separated from each other. Thus, by disposing the dense interconnector so as to continue from the electrolyte on the top face of the part of the substrate (between the top face of the substrate and the electrolyte), coming into contact with the top face of the substrate, and further continuing to the side face of the fuel electrode of the immediately following cell before coming into contact with the underside face of the electrolyte (that is, between the underside face of the electrolyte and the fuel electrode), as described above, sealing performance can be enhanced.

Fabrication of Interconnector Configuration Construction 9

A process of fabricating the interconnector configuration construction 9 is basically a process for co-sintering the respective fuel electrodes, the dense interconnector material, or the interconnector material turning dense by sintering, and the respective electrolytes before attaching the respective air electrodes thereto. A co-sintered body thereof may be separately joined to the substrate through the intermediary of a joining material, and so forth, however, such co-sintering may be executed by co-sintering of those including the substrate. The process comprises the following steps.

(1) The fuel electrodes are disposed on the substrate. This step can be implemented, for example, by applying powdery constituent material of the fuel electrode, in slurry form, to the substrate.

(2) The dense interconnector material, or the interconnector material turning dense by sintering is attached. Attaching spots correspond to portions indicated as the interconnector (dense) in FIG. 18.

(3) Dipping with electrolyte is carried out. This step can be implemented, for example, by dipping, in other words, immersing a workpiece, having come through the steps (1) to (2) as above, into an electrolytic slurry.

(4) The workpiece having come through the steps (1) to (3) as above is subjected to co-sintering. By so doing, the substrate, the fuel electrodes, the dense interconnector material, or the interconnector material turning dense by sintering, and the electrolytes, are co-sintered.

(5) Portions of the electrolyte, on top of the dense interconnector material, are removed by etching. The portions of the electrolyte, to be removed, are portions on the right and left sides, respectively, of the bottom of a leg part (on the right side) of a portion of the cell, indicated as the interconnector (need not be dense) in FIG. 18, and FIG. 18 shows the shape of the electrolyte after partial removal (the interconnector (need not be dense) is not formed as yet at this stage).

(6) The air electrodes are applied thereto to be thereby sintered.

(7) The interconnector (need not be dense) is attached to respective portions of the cells, indicated as the interconnector "(need not be dense)", in FIG. 18. In the case of using material containing metal, such as Ag, and so forth, as an interconnector (dense) material, thereby posing a problem with chemical stability of Ag and so forth, at the operating temperature of an SOFC, such a problem can be avoided by covering the interconnector (dense) material portions of the cells with a glass material, and so forth.

Interconnector Configuration Construction 10

Figure 19:
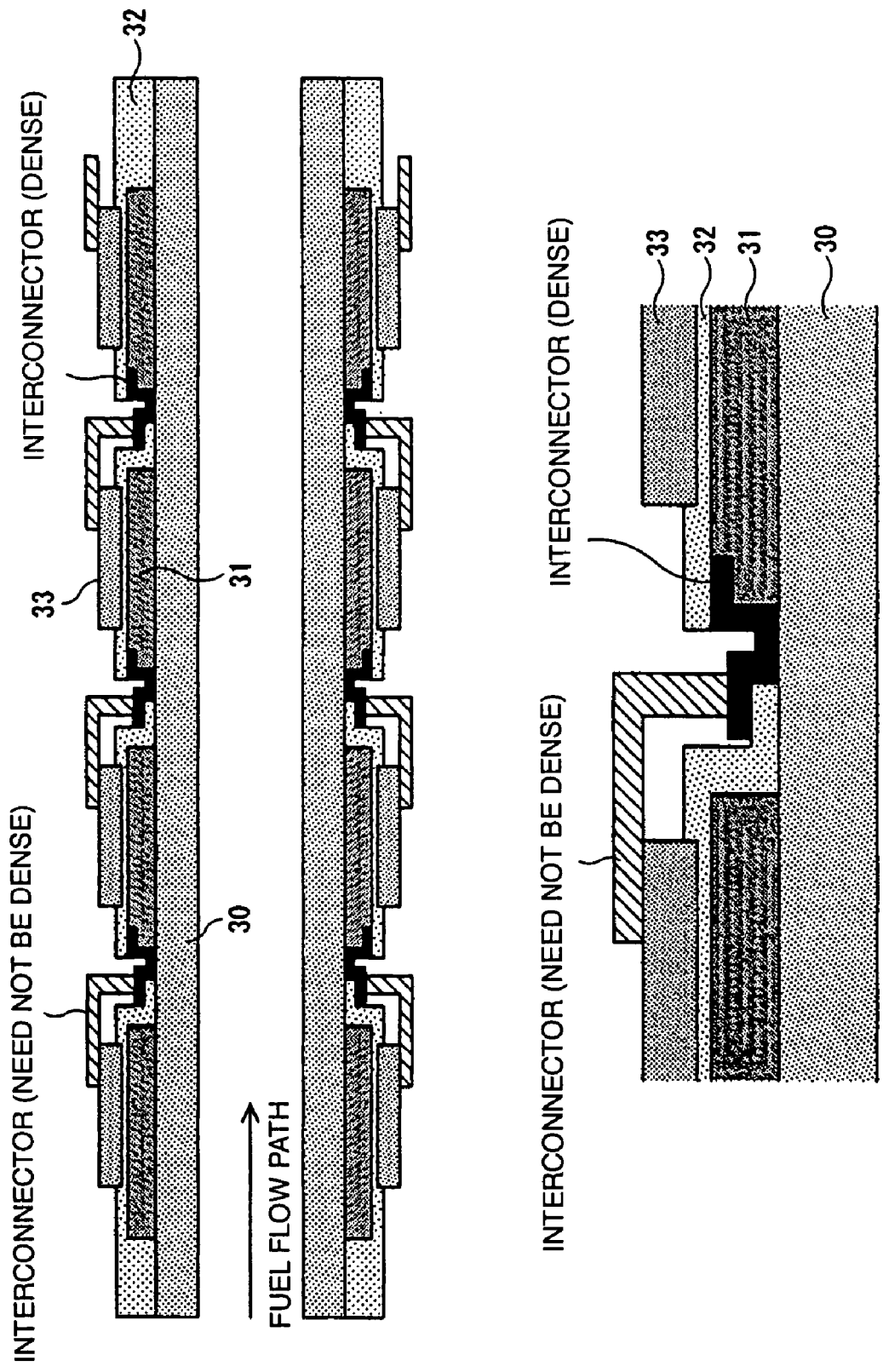
FIG. 19 is a view showing the interconnector configuration construction 10 according to the invention.

FIG. 19 is a view showing the interconnector configuration construction 10. The dense interconnector is disposed between the adjacent cells. As shown FIG. 19, with the interconnector configuration construction 10, the respective cells are structured as seen in section such that a side face of the both side faces of the fuel electrode, on the upstream side of fuel flow, is not covered with the electrolyte while the other side face of the fuel electrode, on the downstream side of the fuel flow, is covered with the electrolyte, and the electrolyte covers the top face of part of the substrate. Further, the dense interconnector is structured so as to continue from the top face of part of the electrolyte, on the top face of the part of the substrate, to a side face thereof, coming into contact with the top face of the substrate, and further continuing to a side face of the fuel electrode of the immediately following cell before coming into contact with the underside face of the electrolyte (that is, between the underside face of the electrolyte and the fuel electrode). With the interconnector configuration construction 10, the electrolytes are completely separated between the respective cells, that is, the respective electrolytes of the adjacent cells are completely separated from each other. Thus, sealing performance can be enhanced by disposing the dense interconnector so as to continue from the top face of the part of the electrolyte, on the top face of the part of the substrate, coming into contact with the top face of the substrate, via the side face of the part of the electrolyte, and further continuing to the side face of the fuel electrode of the immediately following cell before coming into contact with the underside face of the electrolyte (that is, between the underside face of the electrolyte and the fuel electrode), as described above.

Fabrication of Interconnector Configuration Construction 10

A process of fabricating the interconnector configuration construction 10 is basically a process for co-sintering the respective fuel electrodes, the dense interconnector material, or the interconnector material turning dense by sintering, and the respective electrolytes before attaching the respective air electrodes thereto. A co-sintered body thereof may be separately joined to the substrate through the intermediary of a joining material, and so forth, however, such co-sintering may be executed by co-sintering of those including the substrate. The process comprises the following steps:

(1) The fuel electrodes are disposed on the substrate. This step can be implemented, for example, by applying powdery constituent material of the fuel electrode, in slurry form, to the substrate.

(2) The electrolytes formed in a sheet shape are placed on top of the fuel electrodes as shown as the electrolytes in FIG. 19.

(3) The dense interconnector material, or the interconnector material turning dense by sintering, formed in a sheet shape, is disposed so as to cover the top face of part of the electrolyte, and a side face thereof while the other end of the dense interconnector material, or the interconnector material turning dense by sintering comes underneath the electrolyte (that is, between the fuel electrode and the electrolyte. The dense interconnector material, or the interconnector material turning dense by sintering, as formed, is a sectional shape indicated as the interconnector (dense) in FIG. 19, covering the top face of part of the electrolyte (extending to the top face of the substrate) on the downstream side, in the direction of fuel flow, continuing to a side face thereof, coming into contact with the top face of the substrate, and further continuing from a side face of the fuel electrode to the top face thereof as the respective cells are seen in section.

(4) A workpiece having come through the steps (1) to (3) as above is subjected to co-sintering. By so doing, the substrate, the fuel electrodes, the dense interconnector material, or the interconnector material turning dense by sintering, and the electrolytes, are co-sintered.

(5) The air electrodes are applied thereto to be thereby sintered.

(6) The interconnector (need not be dense) is attached. By so doing, the air electrode is linked with the respective dense interconnectors.

Interconnector Configuration Construction 11

Figure 20:
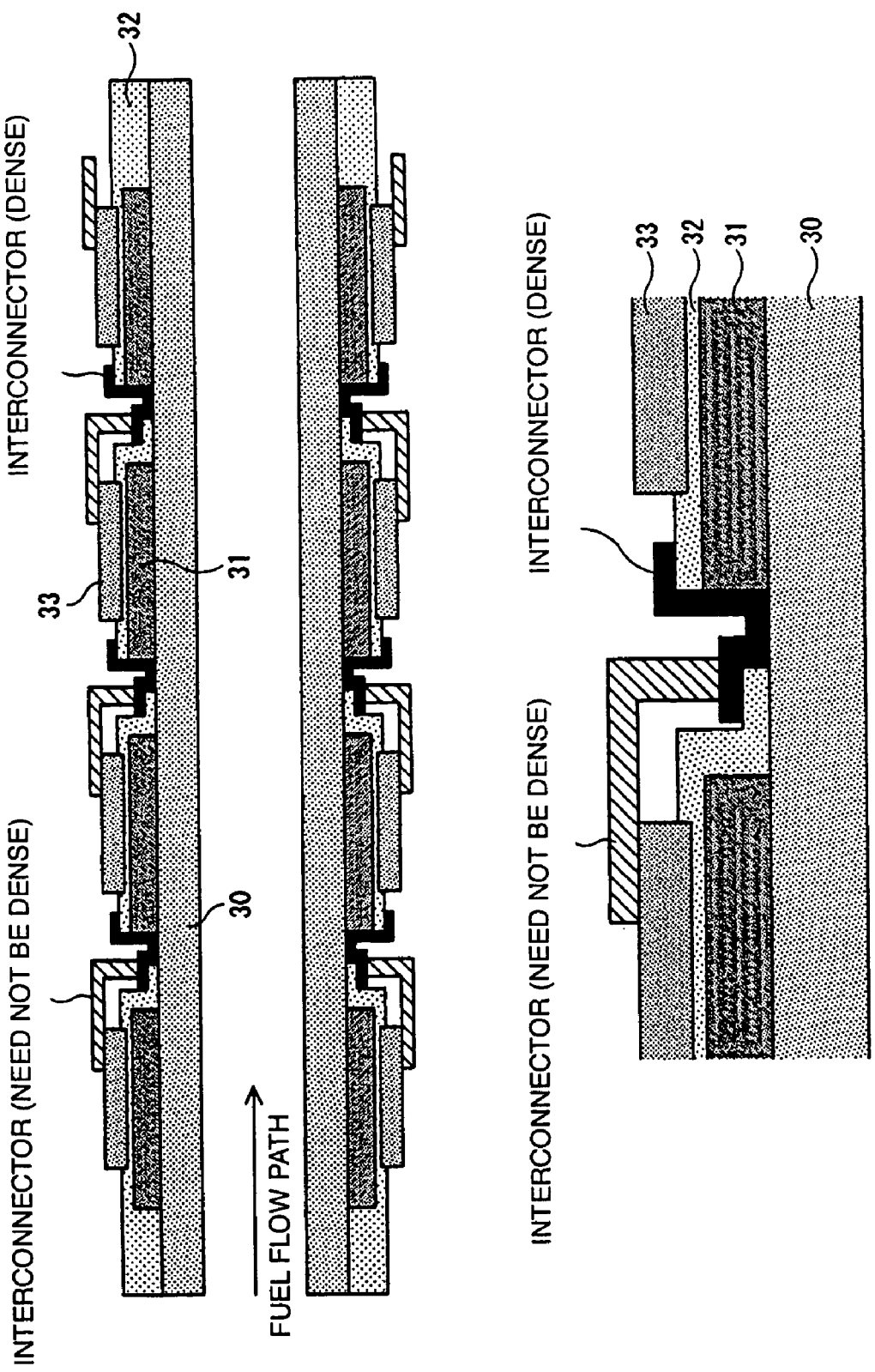
FIG. 20 is a view showing the interconnector configuration construction 11 according to the invention.

FIG. 20 is a view showing the interconnector configuration construction 11. As shown in FIG. 20, with the interconnector configuration construction 11, the respective cells are structured as seen in section such that a side face of the both side faces of the fuel electrode, on the upstream side of fuel flow, is not covered with the electrolyte while the other side face of the fuel electrode, on the downstream side of the fuel flow, is covered with the electrolyte, and the electrolyte covers the top face of part of the substrate. Further, the dense interconnector is structured so as to continue from the top face of part of the electrolyte, on the top face of the part of the substrate, to a side face of the fuel electrode of the immediately following cell, after coming into contact with a side face of the part of the electrolyte, and the top face of the substrate, and further, to continue to a side face of the electrolyte before coming into contact with the top face thereof. With the interconnector configuration construction 11, the electrolytes are completely separated between the respective cells, that is, the respective electrolytes of the adjacent cells are completely separated from each other. Thus, sealing performance can be enhanced by disposing the dense interconnector so as to continue from the top face of the part of the electrolyte, on the top face of the part of the insulator substrate, to the side face of the fuel electrode of the immediately following cell, after coming into contact with a side face of the part of the electrolyte, and the top face of the substrate and further, to continue to a side face of the electrolyte before coming into contact with the top face thereof, as described above.

Fabrication of Interconnector Configuration Construction 11

A process of fabricating the interconnector configuration construction 11 is basically a process for co-sintering the respective fuel electrodes, the dense interconnector material, or the interconnector material turning dense by sintering, and the respective electrolytes before attaching the respective air electrodes thereto. A co-sintered body thereof may be separately joined to the substrate through the intermediary of a joining material, and so forth, however, such co-sintering may be executed by co-sintering of those including the substrate. The process comprises the following steps:

(1) The fuel electrodes are disposed on the substrate. This step can be implemented, for example, by applying powdery constituent material of the fuel electrode, in slurry form, to the substrate.

(2) The electrolytes formed in a sheet shape are placed on top of the fuel electrodes as shown as the electrolytes in FIG. 20.

(3) The dense interconnector material, or the interconnector material which turns dense by sintering, formed in a sheet shape, is disposed. The dense interconnector material, or the interconnector material which turns dense by sintering, as formed, is a sectional shape covering the top face of part of the electrolyte (extending to the top face of the substrate) on the downstream side of the respective cells, in the direction of fuel flow, continuing to a side face of the electrolyte, and coming into contact with the top face of the substrate, and further continuing from a side face of the fuel electrode to the top face of the electrolyte after a side face thereof. The dense interconnector material, or the interconnector material turning dense by sintering, formed in the sheet shape, are placed as indicated as the interconnector (dense) in FIG. 20.

(4) A workpiece having come through the steps (1) to (3) as above is subjected to co-sintering. By so doing, the substrate, the fuel electrodes, the dense interconnector material, or the interconnector material turning dense by sintering, and the electrolytes, are co-sintered.

(5) The air electrodes are applied thereto to be thereby sintered.

(6) The interconnector (need not be dense) is attached. By so doing, the air electrode is linked with the respective dense interconnectors.

With respective processes of fabricating the interconnector configuration constructions 1 to 11, the constituent material of the air electrode is disposed on the electrolytes prior to sintering. Temperature for the sintering varies depending on the constituent material of the air electrode, and is normally in a range of 800 to 1150° C. Further, the interconnector (need not be dense) is attached between the dense interconnector and the respective air electrodes, and upon attachment thereof, heat treatment is applied as necessary. Heating temperature at that time varies depending on the kind of the constituent material of the interconnector (need not be dense), and the constituent materials, and so forth of the air electrode, and the dense interconnector, respectively, but the heat treatment can be applied normally in a range of 200 to 800° C. In the case of using, for example, an Ag paste, heat treatment may be applied, but is not necessarily required.

WORKING EXAMPLES

The invention is described in more detail hereinafter with reference to working examples, however, it is to be understood that obviously the invention is not limited thereto.

Working Example 1

Figure 21:
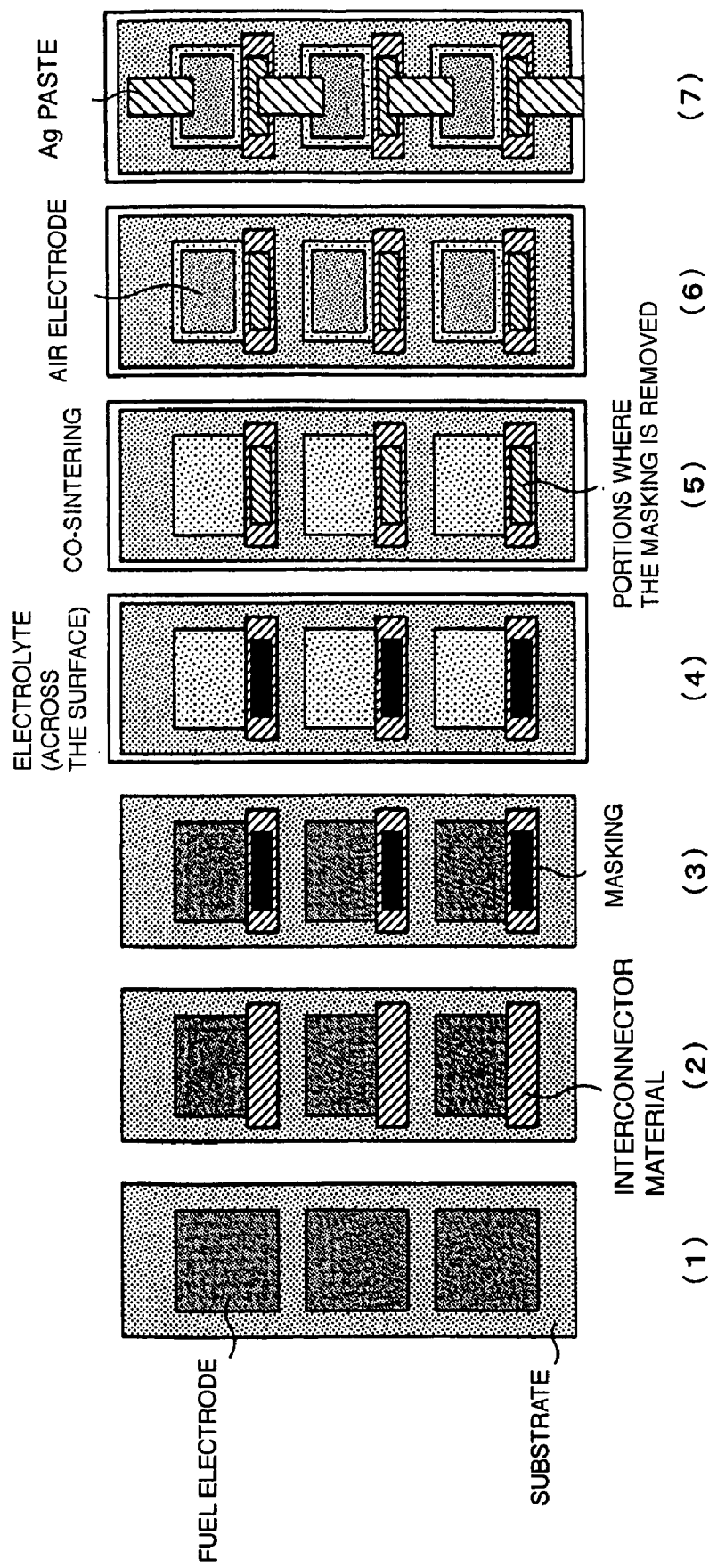
FIG. 21 is a view broadly showing a method of manufacturing an SOFC module according to Working Example 1 of the invention.
Figure 22:
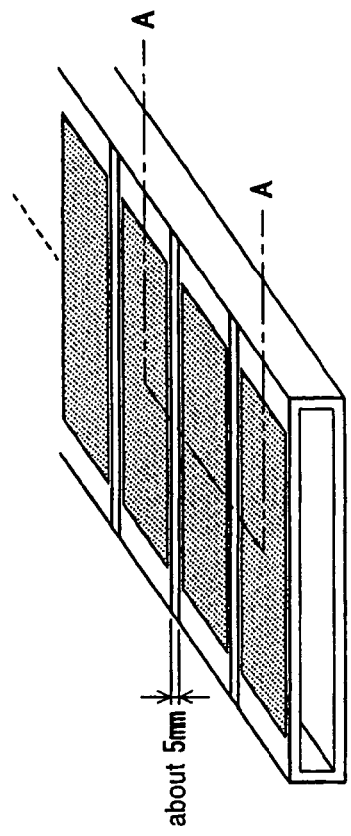
FIGS. 22(a) to 22(c) are views broadly showing the SOFC module manufactured by Working Example 1.
Figure 22:
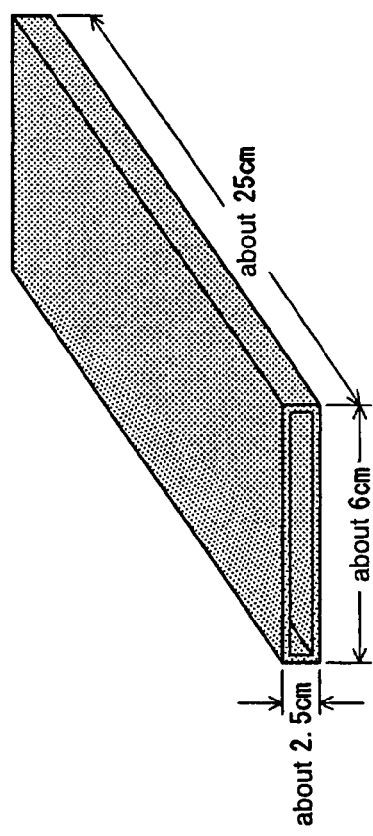
Figure 22:
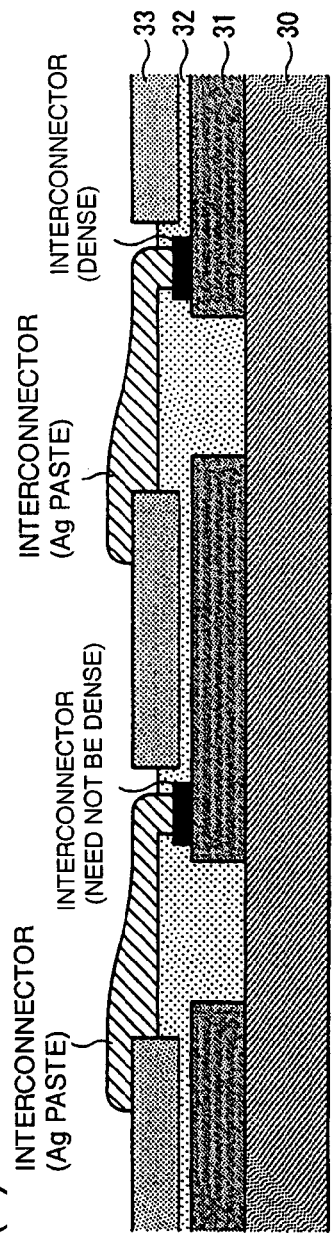

Working Example 1 represents the case where the dense interconnector is attached in advance. FIG. 21 is a view broadly showing a method of manufacturing an SOFC module, and for clarity in explanation, the figure shows the case of the SOFC module provided with three cells. FIG. 22(a) is a perspective view of a substrate, FIG. 22(b) is a perspective view of the substrate with the cells formed thereon, showing the substrate in FIG. 22(a) after enlarged and partially cut, and FIG. 22(c) is a partially sectional view of the SOFC module wherein the cells adjacent to each other are electrically connected in series through the intermediary of an interconnector.

Brief Explanation of a Manufacturing Method According to Working Example 1

An SOFC module is manufactured by taking process steps (1) to (7) in sequence, as shown in FIG. 21. In the process step (1), fuel electrodes are formed on a substrate by screen printing. In the process step (2), an interconnector material is provided on the respective fuel electrodes by screen printing. Subsequently, portions of the respective interconnector materials are masked in the process step (3) to be followed by dip coating with electrolytic material in the process step (4). In the process step (5), respective masks formed in the process step (3) are removed, and thereafter, the substrate, the fuel electrodes, the interconnector material, and electrolytes are co-sintered, thereby forming dense interconnectors. Subsequently, in the process step (6), air electrodes are screen printed on a co-sintered body to be thereby sintered. Then, in the process step (7), the dense interconnector is linked with the respective air electrodes through the intermediary of an electroconductive paste.

1. Fabrication of a Substrate (i) To mixed powders composed of nickel monoxide (manufactured by Nippon Chemical Industry Co. Ltd.), and an yttria-stabilized zirconia (manufactured by Toso Co. Ltd.) mixed at a ratio of 1:4 by weight, addition of graphite (manufactured by Showa Denko Co. Ltd.) in 15 wt. % against the total quantity of the mixed powders was made, and distilled water was added thereto before mixed in a ball mill for 20 hours. (ii) An organic solvent (mixed solvent of toluene and 2-propanol), dispersant, and antifoamer were added to a mixed solution under (i) as above to be reduced into powders by use of a spray dryer. A porous insulator substrate hollow flat in sectional shape was fabricated by the hydrostatic pressure pressing method using the powders as obtained. FIG. 22(a) is the oblique perspective view of the substrate fabricated as above.

2. Fabrication of Fuel Electrodes on the Porous Insulator Substrate Hollow Flat in Sectional Shape (i) Slurry was prepared by adding an organic solvent (mixed solvent of toluene and 2-propanol), dispersant, and antifoamer to 100 g of mixed powders composed of nickel monoxide (manufactured by Nippon Chemical Industry Co. Ltd.), and an yttria-stabilized zirconia (manufactured by Toso Co. Ltd.) mixed at a ratio of 2:3 by weight before mixed in a ball mill for 20 hours. (ii) Fuel electrodes were formed by screen printing on the porous insulator substrate hollow flat in sectional shape, fabricated under (1, Fabrication of a substrate) as above. That is the process step (1) as shown in FIG. 21.

3. Application of an Interconnector Material (i) Slurry was prepared by adding an organic solvent (mixed solvent of toluene and 2-propanol), dispersant, and antifoamer to powders of $La(Ti_{0.8}Nb_{0.2})O_3$ before mixed in a ball mill for 20 hours. (ii) The slurry obtained under (i) as above was applied to the fuel electrodes by screen printing. Those are the process steps (1) to (2), as shown in FIG. 21.

4. Preparation of Electrolytic Material: Fabrication of Electrolytes on the Porous Insulator Substrate Hollow Flat in Sectional Shape, and Fabrication of Interconnectors (i) Slurry was prepared by adding an organic solvent (mixed solvent of toluene and 2-propanol), dispersant, and antifoamer to an yttria-stabilized zirconia (manufactured by Toso Co. Ltd.) before mixed in a ball mill for 24 hours. (ii) Masking was provided on a portion of the interconnector material, smaller in width by 1 mm than the respective interconnector materials applied under (3. Application of an Interconnector Material) as above, and a workpiece was immersed, that is, dipped in the slurry obtained under (i) as above, which was repeated twice. Those are the process steps (2) to (4) via (3), as shown in FIG. 21. (iii) The substrate processed under (ii) as above was subjected to heat treatment at 1500° C. for 7.5 hours, thereby co-sintering the substrate, the fuel electrodes, and electrolytes while forming dense interconnectors. Those are the process steps (4) to (5), as shown in FIG. 21.

5. Fabrication of Air Electrodes (i) Slurry was prepared by adding an organic solvent (mixed solvent of toluene and 2-propanol), dispersant, and antifoamer to powders of a perovskite-type oxide $(La_{0.6}Sr_{0.4})Co_{0.2}Fe_{0.8}O_3$ before mixed in a ball mill for 20 hours. (ii) The slurry obtained under (i) as above was applied to the porous insulator substrate hollow flat in sectional shape, fabricated under (1, Fabrication of a substrate) as above by screen printing. (iii) The substrate processed under (ii) as above was subjected to heat treatment at 1150° C. for 5 hours, thereby forming air electrodes. Those are the process steps (5) to (6), as shown in FIG. 21.

6. Connection Between the Air Electrodes and Dense Interconnectors, Respectively Ag paste was applied between the dense interconnector formed under (4. Fabrication of Interconnectors) as above, and the respective air electrodes formed under (5, Fabrication of Air Electrodes) as above, thereby implementing connection therebetween. Those are the process steps (6) to (7), as shown in FIG. 21.

Thus, there was manufactured an SOFC module comprising 32 cells wherein the cells (each cell area=about 4.5 cm$^2$) adjacent to each other are electrically connected in series through the intermediary of the interconnectors. FIG. 22(c) shows the SOFC module in partial section. The SOFC module manufactured was found satisfactorily sealed, and power generation tests to repeat start-up, operation, and shutdown were conducted thereon, whereupon electric power of about 16 W at about 18V was obtained.

Working Example 2

Figure 23:
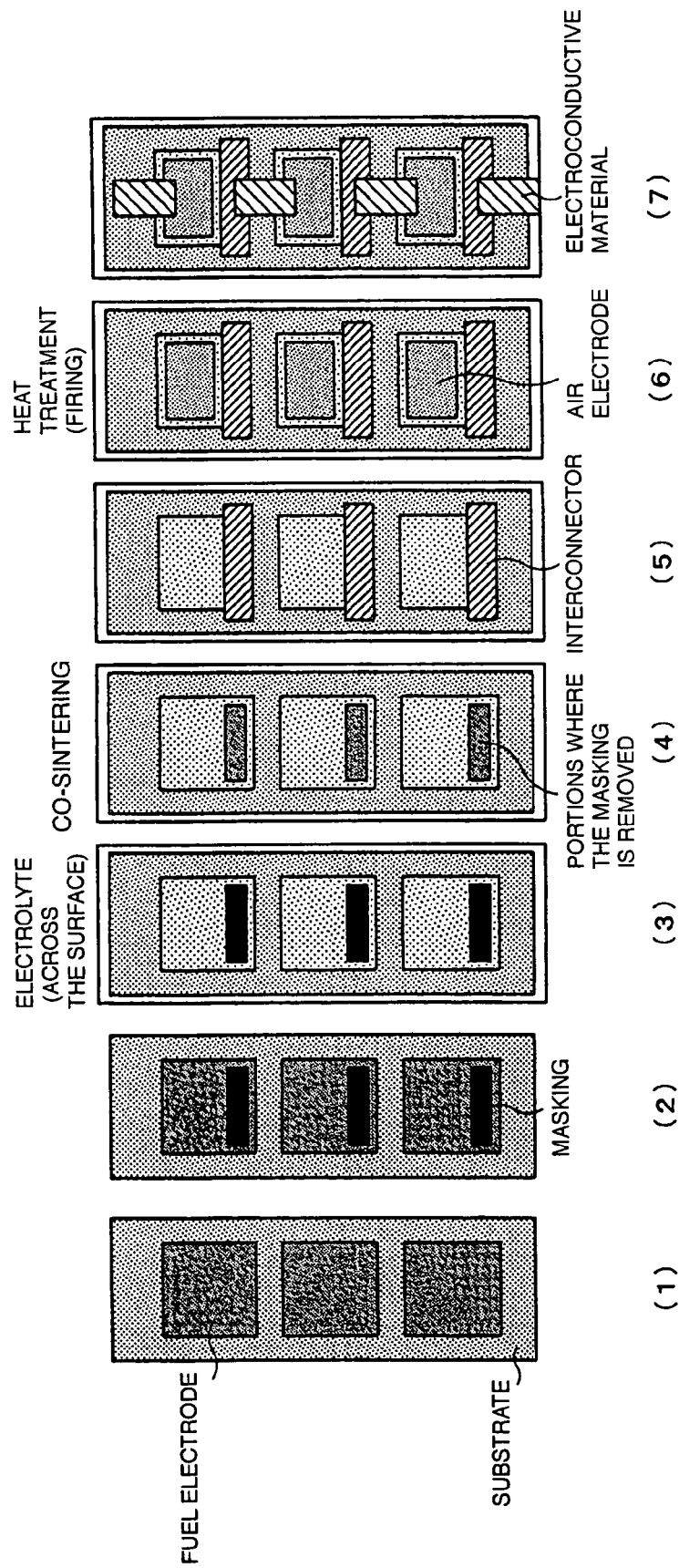
FIG. 23 is a view broadly showing a method of manufacturing an SOFC module according to Working Example 2 of the invention.

Working Example 2 represents the case where the dense interconnector is attached subsequently. FIG. 23 is a view broadly showing a method of manufacturing an SOFC module, and for clarity in explanation, the figure shows the case of the SOFC module provided with three cells.

Brief Explanation of a Manufacturing Method According to Working Example 2

An SOFC module is manufactured by taking process steps (1) to (7) in sequence, as shown in FIG. 23. In the process step (1), fuel electrodes are formed on a substrate by screen printing. In the process step (2), portions of the respective fuel electrodes are masked, and subsequently, a work piece is subjected to dip coating with an electrolytic material in the process step (3). Thereafter, in the process step (4), after removing masks formed in the process step (2), the substrate, the fuel electrodes, electrolytes are co-sintered. In the process step (5) an interconnector material in a tape-like form is stuck onto an exposed portion of the fuel electrode so as to slightly overlap the respective electrolytes. In the process step (6), air electrodes are screen printed on the workpiece and are subjected to heat treatment. By so doing, the air electrodes are fired, and at the same time, dense interconnectors are formed. Then, in the process step (7), the dense interconnector is linked with the respective air electrodes through the intermediary of an electroconductive paste.

1. Fabrication of a Substrate (i) To mixed powders composed of nickel monoxide (NiO: manufactured by Nippon Chemical Industry Co. Ltd.), and an yttria-stabilized zirconia (manufactured by Toso Co. Ltd.) mixed at a ratio of 1:4 by weight, addition of graphite (manufactured by Showa Denko Co. Ltd.) in 15 wt. % against the total quantity of the mixed powders was made, and distilled water was added thereto before mixed in a ball mill for 20 hours. (ii) An organic solvent (mixed solvent of toluene and 2-propanol), dispersant, and antifoamer were added to a mixed solution under (i) as above to be reduced into powders by use of a spray dryer. A porous insulator substrate hollow flat in sectional shape [about 6 cm (W)×about 2.5 cm (H)× about 25 cm (L)] was fabricated by the extrusion molding method using the powders as obtained.

2. Fabrication of Fuel Electrodes on the Porous Insulator Substrate Hollow Flat in Sectional Shape (i) Slurry was prepared by adding an organic solvent (mixed solvent of toluene and 2-propanol), dispersant, and antifoamer to 100 g of mixed powders composed of nickel monoxide (NiO: manufactured by Nippon Chemical Industry Co. Ltd.), and an yttria-stabilized zirconia (manufactured by Toso Co. Ltd.) mixed at a ratio of 2:3 by weight before mixed in a ball mill for 20 hours. (ii) Fuel electrodes were formed by screen printing on the porous insulator substrate hollow flat in sectional shape, fabricated under (1, Fabrication of a substrate) as above. That is the process step (1) as shown in FIG. 23.

3. Fabrication of Electrolytes (i) Slurry was prepared by adding an organic solvent (mixed solvent of toluene and 2-propanol), dispersant, and antifoamer to an yttria-stabilized zirconia (manufactured by Toso Co. Ltd.) before mixed in a ball mill for 24 hours. (ii) A masking tape was attached to interconnector-forming parts of the porous insulator substrate hollow flat in sectional shape, fabricated under (2. Fabrication of Fuel Electrodes on the Porous Insulator Substrate Hollow Flat in Sectional Shape) as above, and a workpiece obtained was immersed, that is, dipped in the slurry obtained under (i) as above, which was repeated twice. Those are the process steps (1) to (3), as shown in FIG. 23. Thereafter, the masking tape was removed. (iii) The substrate processed under (ii) as above was subjected to heat treatment at 1500° C. for 7.5 hours, thereby co-sintering the substrate, the fuel electrodes, and electrolytes. Those are the process steps (3) to (4), as shown in FIG. 23.

4. Attachment of Interconnector Material (i) Slurry was prepared by mixing an organic solvent (mixed solvent of toluene and 2-propanol) with a mixture of Ag powders (produced by Ishifuku Kinzoku Kogyo Co. Ltd.) and glass powders ($SiO_2$—SrO—$K_2O$—$Na_2O$ base bonding material, trade name: ASF 700 produced by Asahi Glass Co. Ltd.), mixed at a ratio of 6:4 by weight, in a ball mill for 20 hours. By the doctor blade method using the slurry, tape-like slurries were formed. (ii) The tape-like slurry obtained under (i) as above was stuck to masking portions of the porous insulator substrate hollow flat in sectional shape, fabricated under (3, Fabrication of Electrolytes) described as above, that is, the portions thereof, where the fuel electrode is exposed after removal of the masking tape, so as to overlap the respective electrolytes to the extent of about 1 mm. That is the process step (5), as shown in FIG. 23.

5. Fabrication of Air Electrodes and Densification of Interconnector Material (i) Slurry was prepared by adding an organic solvent (mixed solvent of toluene and 2-propanol), dispersant, and antifoamer to powders of a perovskite type oxide ($La_{0.6}Sr_{0.4}$)$Co_{0.2}Fe_{0.8}O_3$ before mixed in a ball mill for 20 hours. (ii) The slurry obtained under (i) as above was applied to the porous insulator substrate hollow flat in sectional shape, fabricated under (4, Attachment of Interconnector Material) described as above, and the surface of the electrolyte on the respective fuel electrodes, by screen printing. (iii) The substrate processed under (ii) as above was subjected to heat treatment at 925° C. for 2 hours, thereby forming air electrodes as well as dense interconnectors. That is the process step (6) shown in FIG. 23.

6. Formation of Material for Effecting Connection Between the Air Electrodes and the Dense Interconnectors, Respectively Slurry was prepared by mixing an organic solvent (mixed solvent of toluene and 2-propanol) with a mixture of Ag powders (produced by Ishifuku Kinzoku Kogyo Co. Ltd.) and glass powders ($SiO_2$—SrO—$K_2O$—$Na_2O$ base bonding material, trade name: ASF 700 produced by Asahi Glass Co. Ltd.), mixed at a ratio of 8:2 by weight, in a ball mill for 20 hours. By the screen printing method using the slurry, tape-like slurries were formed.

7. Connection Between the Air Electrodes and Dense Interconnectors, Respectively The tape-like slurry obtained under (6. Formation of Material for Effecting Connection between the Air Electrodes and the Dense Interconnectors, respectively) described as above was disposed on the surfaces of the respective air electrodes obtained under (5. Fabrication of Air Electrodes and Densification of Interconnector Material) described as above, and the dense interconnectors, and was subsequently subjected to heat treatment at 800° C. for 2 hours, thereby implementing connection between the respective air electrodes, and the dense interconnector. Those are the process steps (6) to (7), as shown in FIG. 23.

Thus, there was manufactured an SOFC module comprising 32 cells wherein the cells (each cell area=about 4.5 $cm^2$) adjacent to each other are electrically connected in series through the intermediary of the interconnectors. The SOFC module manufactured was found satisfactorily sealed, and power generation tests to repeat start-up, operation, and shutdown were conducted thereon, whereupon electric power of about 20 W at about 22V was obtained.

Working Example 3

Ag powders (produced by Kojundo Chemicals Co. Ltd.), and glass powders ($SiO_2$—$Al_2O_3$—$K_2O$ base glass sealing material: softening point 800° C.) were mixed at various ratios ranging from a ratio of 9:1 to 3:7 by weight, and mixtures obtained were subjected to heat treatment at various temperatures, thereby fabricating an interconnector. Measurements were taken on gas-sealing performance and electroconductivity of the interconnector for evaluation of the same as a constituent member of an SOFC module.

The results of the evaluation are shown in Table 1 below. As shown in Table 1, it is evident that if an electroconductive material is Ag, heat treatment temperature need to be below 950° C. in order to obtain acceptable gas-sealing performance (indicated as sealing performance in Table 1), and electroconductivity. It is also evident that electroconductivity is acceptable even if heat treatment temperature is 800° C., however, this temperature poses a problem in respect of sealing performance. Further, it is shown that electroconductivity is acceptable if Ag content is not lower than 30 wt. %.

TABLE 1

| Ag powder:glass powder (wt. ratio) | | heat treatment temperature (° C.) | | | | |
|---|---|---|---|---|---|---|
| | | 800 | 900 | 925 | 950 | 1000 |
| 9:1 | sealing perform. | X | ○ | ○ | X | X |
| | conductivity | ○ | ○ | ○ | X | X |
| 8:2 | sealing perform. | X | ○ | ○ | X | X |
| | conductivity | ○ | ○ | ○ | X | X |
| 7:3 | sealing perform. | X | ○ | ○ | X | X |
| | conductivity | ○ | ○ | ○ | X | X |
| 6:4 | sealing perform. | X | ○ | ○ | X | X |
| | conductivity | ○ | ○ | ○ | X | X |
| 5:5 | sealing perform. | X | ○ | ○ | X | X |
| | conductivity | ○ | ○ | ○ | X | X |
| 4:6 | sealing perform. | X | ○ | ○ | X | X |
| | conductivity | ○ | ○ | ○ | X | X |
| 3:7 | sealing perform. | X | ○ | ○ | X | X |
| | conductivity | ○ | ○ | ○ | X | X |

The invention claimed is:

1. A method of manufacturing a solid oxide fuel cell module made up of a plurality of cells provided adjacent to one another and electrically connected in series by an interconnector provided therebetween, each cell comprising a fuel electrode, an electrolyte and an air electrode sequentially formed on a surface of a substrate having an internal fuel flow path provided therein, at least the surface of the substrate in contact with the cells and interconnectors being electrically insulating, said method comprising the steps of:

providing respective fuel electrodes and respective electrolytes on the surface of the substrate;

co-sintering the respective fuel electrodes and respective electrolytes;

providing a respective first part of the respective interconnectors having a density that is not less than 90% of the theoretical density of the interconnector material or that will have a density of not less than 90% of the theoretical density of the interconnector material after sintering in contact with the respective fuel electrodes and the respective electrolytes;

forming respective air electrodes on the respective electrolytes; and electrically connecting the respective electrodes with the respective first parts of the respective interconnectors via respective second parts of the interconnectors which have a density less than the respective first parts.

2. A method of manufacturing a solid oxide fuel cell module according to claim 1, wherein a mixture of MgO, and $MgAl_2O_4$ is used as a constituent material of the substrate and the interconnectors.

3. A method of manufacturing a solid oxide fuel cell module according to claim 2, wherein the mixture of MgO, and $MgAl_2O_4$ is a mixture of MgO, and $MgAl_2O_4$, containing 20 to 70 vol. % of MgO.

4. A method of manufacturing a solid oxide fuel cell module according to claim 1, wherein an yttria-stabilized zirconia expressed by chemical formula $(Y_2O_3)_x(ZrO_2)_{1-x}$, wherein x=0.03 to 0.12, is used as a constituent material of the substrate and the interconnectors.

5. A method of manufacturing a solid oxide fuel cell module according to claim 1, wherein a mixture of a mixture composed of MgO, and $MgAl_2O_4$, and an yttria-stabilized zirconia expressed by chemical formula $(Y_2O_3)_x(ZrO_2)_{1-x}$, wherein x=0.03 to 0.12, is used as a constituent material of the substrate and the interconnectors.

6. A method of manufacturing a solid oxide fuel cell module according to claim 5, wherein the mixture of MgO, and $MgAl_2O_4$ is a mixture of MgO, and $MgAl_2O_4$, containing 20 to 70 vol. % of MgO.

7. A method of manufacturing a solid oxide fuel cell module according to claim 1, wherein a constituent material of the substrate and the interconnectors is a material composed of Ni diffused in a range not more than 35 vol. %.

8. A method of manufacturing a solid oxide fuel cell module according to claim 1, wherein a material composed mainly of Ni is used as a constituent material of the fuel electrode.

9. A method of manufacturing a solid oxide fuel cell module according to claim 1, wherein a mixture of Ni and an yttria-stabilized zirconia expressed by chemical formula $(Y_2O_3)_x(ZrO_2)_{1-x}$, wherein x=0.03 to 0.12, with not less than 40 vol. % of Ni diffused in the mixture, is used as a constituent material of the fuel electrode.

10. A method of manufacturing a solid oxide fuel cell module according to claim 1, wherein an yttria-stabilized zirconia expressed by chemical formula $(Y_2O_3)_x(ZrO_2)_{1-x}$, wherein x=0.05 to 0.15, is used as a constituent material of the electrolyte.

11. A method of manufacturing a solid oxide fuel cell module according to claim 1, wherein a scandia-stabilized zirconia expressed by chemical formula $(Sc_2O_3)_x(ZrO_2)_{1-x}$, wherein x=0.05 to 0.15, is used as a constituent material of the electrolyte.

12. A method of manufacturing a solid oxide fuel cell module according to claim 1, wherein an yttria-doped ceria expressed by chemical formula $(Y_2O_3)_x(CeO_2)_{1-x}$, wherein x=0.02 to 0.4, is used as a constituent material of the electrolyte.

13. A method of manufacturing a solid oxide fuel cell module according to claim 1, wherein a gadolinia-doped ceria expressed by chemical formula $(Gd_2O_3)_x(CeO_2)_{1-x}$, wherein x=0.02 to 0.4, is used as a constituent material of the electrolyte.

14. A method of manufacturing a solid oxide fuel cell module according to claim 1, wherein a material composed of a mixture of a glass and an electroconductive material is used as a constituent material of the interconnector.

15. A method of manufacturing a solid oxide fuel cell module according to claim 14, wherein the glass in the mixture of the glass and the electroconductive material is a glass with thermal expansion coefficient falling in a range of 8.0 to $14.0 \times 10^{-6} K^{-1}$.

16. A method of manufacturing a solid oxide fuel cell module according to claim 14, wherein the glass in the mixture of the glass and the electroconductive material is a glass with a softening point falling in a range of 600 to 1000° C.

17. A method of manufacturing a solid oxide fuel cell module according to claim 14, wherein the electroconductive material in the mixture of the glass and the electroconductive material is a metal.

18. A method of manufacturing a solid oxide fuel cell module according to claim 17, wherein the metal is at least one kind of metal selected from the group consisting of Pt, Ag, Au, Ni, Co, W, and Pd.

19. A method of manufacturing a solid oxide fuel cell module according to claim 17, wherein the metal is an alloy containing Ag.

20. A method of manufacturing a solid oxide fuel cell module according to claim 14, wherein the electroconductive material in the mixture of the glass and the electroconductive material is an electroconductive oxide.

21. A method of manufacturing a solid oxide fuel cell module according to claim 20, wherein the electroconductive oxide is a perovskite-type ceramics composed of not less than two elements selected from the group consisting of La, Cr, Y, Ce, Ca, Sr, Mg, Ba, Ni, Fe, Co, Mn, Ti, Nd, Pb, Bi, and Cu.

22. A method of manufacturing a solid oxide fuel cell module according to claim 20, wherein the electroconductive oxide is an oxide expressed by chemical formula $(Ln, M)CrO_3$, wherein Ln refers to lanthanoids and M refers to Ba, Ca, Mg, or Sr.

23. A method of manufacturing a solid oxide fuel cell module according to claim 20, wherein the electroconductive oxide is an oxide expressed by chemical formula $M(Ti_{1-x}Nb_x)O_3$, wherein M refers to at least one element selected from the group consisting of Ba, Ca, Li, Pb, Bi, Cu, Sr, La, Mg, and Ce, x=0 to 0.4.

24. A method of manufacturing a solid oxide fuel cell module according to claim 14, wherein the electroconductive material content of the mixture of the glass and the electroconductive material is not less than 30 vol. % of the mixture.

25. A method of manufacturing a solid oxide fuel cell module according to claim 14, wherein the mixture of the glass and the electroconductive material is subjected to heat treatment at not higher than the melting point of the electroconductive material after the mixture is applied between the fuel electrode of one of the adjacent cells, and the air electrode of the other cell.

26. A method of manufacturing a solid oxide fuel cell module according to claim 1, wherein only portions of the interconnector connecting the fuel electrode of one of the adjacent cells with the air electrode of the other cell, in contact with the fuel electrode, and the electrolyte, respectively, are formed of a material composed mainly of Ag.

27. A method of manufacturing a solid oxide fuel cell module according to claim 1, wherein only portions of the interconnector connecting the fuel electrode of one of the adjacent cells with the air electrode of the other cell, in contact with the fuel electrode, and the electrolyte, respectively, are formed of a material composed of one kind or not less than two kinds of material selected from the group consisting of Ag, Ag solder, and a mixture of Ag and the glass.

28. A method of manufacturing a solid oxide fuel cell module according to claim 1, wherein only portions of the interconnector connecting the fuel electrode of one of the adjacent cells with the air electrode of the other cell, in contact with the fuel electrode, and the electrolyte, respectively, are formed of an electroconductive oxide.

29. A method of manufacturing a solid oxide fuel cell module according to claim 1, wherein an oxide material containing Ti is used as a constituent material of the interconnector connecting the fuel electrode of one of the adjacent cells with the air electrode of the other cell.

30. A method of manufacturing a solid oxide fuel cell module according to claim 29, wherein the oxide material containing Ti is a material expressed by chemical formula $M(Ti_{1-x}Nb_x)O_3$, wherein M refers to at least one element selected from the group consisting of Ba, Ca, Pb, Bi, Cu, Sr, La, Li, and Ce, x=0 to 0.4.

31. A method of manufacturing a solid oxide fuel cell module made up of a plurality of cells provided adjacent to one another and electrically connected in series by an interconnector provided therebetween, each cell comprising a fuel electrode, an electrolyte and an air electrode sequentially formed on a surface of a substrate having an internal fuel flow path provided therein, at least the surface of the substrate in contact with the cells and interconnectors being electrically insulating, said method comprising the steps of:
providing respective fuel electrodes and respective electrolytes on the surface of the substrate;
co-sintering the substrate, the respective fuel electrodes and the respective electrolytes;
providing a respective first part of the respective interconnectors having a density that is not less than 90% of the theoretical density of the interconnector material or that will have a density of not less than 90% of the theoretical density of the interconnector material after sintering in contact with the respective fuel electrodes and the respective electrolytes;
forming respective air electrodes on the respective electrolytes; and
electrically connecting the respective air electrodes with the respective first parts of the respective interconnectors via respective second parts of the respective interconnectors which have a density less than the respective first parts.

32. A method of manufacturing a solid oxide fuel cell module made up of a plurality of cells provided adjacent to one another and electrically connected in series by an interconnector provided therebetween, each cell comprising a fuel electrode, an electrolyte and an air electrode sequentially formed on a surface of a substrate having an internal fuel flow path provided therein, at least the surface of the substrate in contact with the cells and interconnectors being electrically insulating, said method comprising the steps of:
providing respective fuel electrodes, respective electrolytes and respective interconnectors on the surface of the substrate, a respective first part of the respective interconnectors having a density that is not less than 90% of the theoretical density of the interconnector material or that will have a density of not less than 90% of the theoretical density of the interconnector material after sintering in contact with the respective fuel electrodes and the respective electrolytes;
co-sintering the respective fuel electrodes, respective electrolytes and respective interconnectors;
forming respective air electrodes on the respective electrolytes; and
electrically connecting the respective air electrodes with the respective first parts of the respective interconnectors via respective second parts of the respective interconnectors which have a density less than the respective first parts.

33. A method of manufacturing a solid oxide fuel cell module made up of a plurality of cells provided adjacent to one another and electrically connected in series by an interconnector provided therebetween, each cell comprising a fuel electrode, an electrolyte and an air electrode sequentially formed on a surface of a substrate having an internal fuel flowpath provided therein, at least the surface of the substrate in contact with the cells and interconnectors being electrically insulating, said method comprising the steps of:
providing respective fuel electrodes, respective electrolytes and respective interconnectors on the surface of the substrate, a respective first part of the respective interconnectors having a density that is not less than 90% of the theoretical density of the interconnector material or that will have a density of not less than 90% of the theoretical density of the interconnector material after sintering in contact with the respective fuel electrodes and the respective electrolytes;
co-sintering the substrate, the respective fuel electrodes, respective electrolytes and respective interconnectors;
forming respective air electrodes on the respective electrolytes; and
electrically connecting the respective air electrodes with the respective first parts of the respective interconnectors via respective second parts of the respective interconnectors which have a density less than the respective first parts.

34. A method of manufacturing a solid oxide fuel cell module made up of a plurality of cells provided adjacent to one another and electrically connected in series by an interconnector provided therebetween, each cell comprising a fuel electrode, an electrolyte and an air electrode sequentially formed on a surface of a substrate having an internal fuel flow path provided therein, at least the surface of the substrate in contact with the cells and interconnectors being electrically insulating, said method comprising the steps of:
providing respective fuel electrodes on the surface of the substrate;
providing a respective first part of the respective interconnectors having a density that is not less than 90% of the theoretical density of the interconnector material or that will have a density of not less than 90% of the theoretical density of the interconnector material after sintering in contact with the respective fuel electrodes;
providing the respective electrolytes on the respective fuel electrodes;
co-sintering the respective interconnectors, the respective fuel electrodes and the respective electrolytes;
forming respective air electrodes on the respective electrolytes; and
electrically connecting the respective air electrodes with the respective first parts of the respective interconnectors via respective second parts of the respective interconnectors which have a density less than the respective first parts.

35. A method of manufacturing a solid oxide fuel cell module made up of a plurality of cells provided adjacent to one another and electrically connected in series by an interconnector provided therebetween, each cell comprising a fuel electrode, an electrolyte and an air electrode sequentially formed on a surface of a substrate having an internal fuel flow path provided therein, at least the surface of the substrate in contact with the cells and interconnectors being electrically insulating, said method comprising the steps of:

providing respective fuel electrodes on the surface of the substrate;

providing a respective first part of the respective interconnectors having a density that is not less than 90% of the theoretical density of the interconnector material or that will have a density of not less than 90% of the theoretical density of the interconnector material after sintering in contact with the respective fuel electrodes;

providing the respective electrolytes on the respective fuel electrodes;

co-sintering the respective interconnectors, the respective fuel electrodes and the respective electrolytes;

forming respective air electrodes on the respective electrolytes; and electrically connecting the respective air electrodes with the respective first parts of the respective interconnectors via respective second parts of the respective interconnectors which have a density less than the respective first parts.

* * * * *